United States Patent [19]
Gelbart et al.

[11] Patent Number: 5,920,394
[45] Date of Patent: Jul. 6, 1999

[54] OPTICAL COORDINATE MEASURING MACHINE

[75] Inventors: Daniel Gelbart; Michel G. Laberge, both of Vancouver, Canada

[73] Assignee: Research Corporation Technologies, Inc., Tucson, Ariz.

[21] Appl. No.: 08/706,395

[22] Filed: Aug. 30, 1996

Related U.S. Application Data

[60] Provisional application No. 60/003,141, Sep. 1, 1995.

[51] Int. Cl.$^6$ .................................................. G01B 11/14
[52] U.S. Cl. ............................................................. 356/375
[58] Field of Search .................................... 356/375, 358, 356/363, 1, 4, 4.5, 373, 376, 141.1, 152, 356; 33/503, 502; 250/561, 231.11

[56] References Cited

U.S. PATENT DOCUMENTS

| | | | |
|---|---|---|---|
| 4,585,350 | 4/1986 | Pryor . | |
| 4,621,926 | 11/1986 | Merry et al. . | |
| 4,627,722 | 12/1986 | Falk et al. . | |
| 4,647,206 | 3/1987 | Kunzmann et al. . | |
| 4,725,146 | 2/1988 | Hutchin | 356/375 |
| 4,790,651 | 12/1988 | Brown et al. . | |
| 5,106,192 | 4/1992 | Tuckeer et al. . | |
| 5,198,877 | 3/1993 | Schultz . | |
| 5,305,091 | 4/1994 | Gelbart et al. | 356/375 |

FOREIGN PATENT DOCUMENTS

| | | |
|---|---|---|
| 0 310 235 | 4/1989 | European Pat. Off. . |
| 2 285 550 | 7/1995 | United Kingdom . |

OTHER PUBLICATIONS

"Mathematical Modelling and Simulation Analysis of a Pointing, Acquisition, and Tracking System For Laser–Based Intersatellite Communication" Optical Engineering, vol. 32, No. 11, Nov. 1, 1993, pp. 2749–2763, XP00413680, Victor A. Skormin, et al.

*Primary Examiner*—William Oen
*Attorney, Agent, or Firm*—Scully, Scott, Murphy & Presser

[57] ABSTRACT

An apparatus and method for directing a light beam onto a moving article. The apparatus comprises first and second mirrors for directing the light beam in an adjustable direction, first and second motors connected to the first and second mirrors to move those mirrors, and a tracking system connected to the first and second motors to operate those motors to move the first and second mirrors to maintain the light beam directed at the article as the article moves. Preferable, the tracking system includes coarse and fine tracking subsystems. The coarse tracking subsystem is used to operate the motors to move the mirrors to direct the light beam approximately onto the article, and the fine tracking subsystem is used to operate the motors to operate the mirrors to direct the light beam substantially directly onto the article.

13 Claims, 17 Drawing Sheets

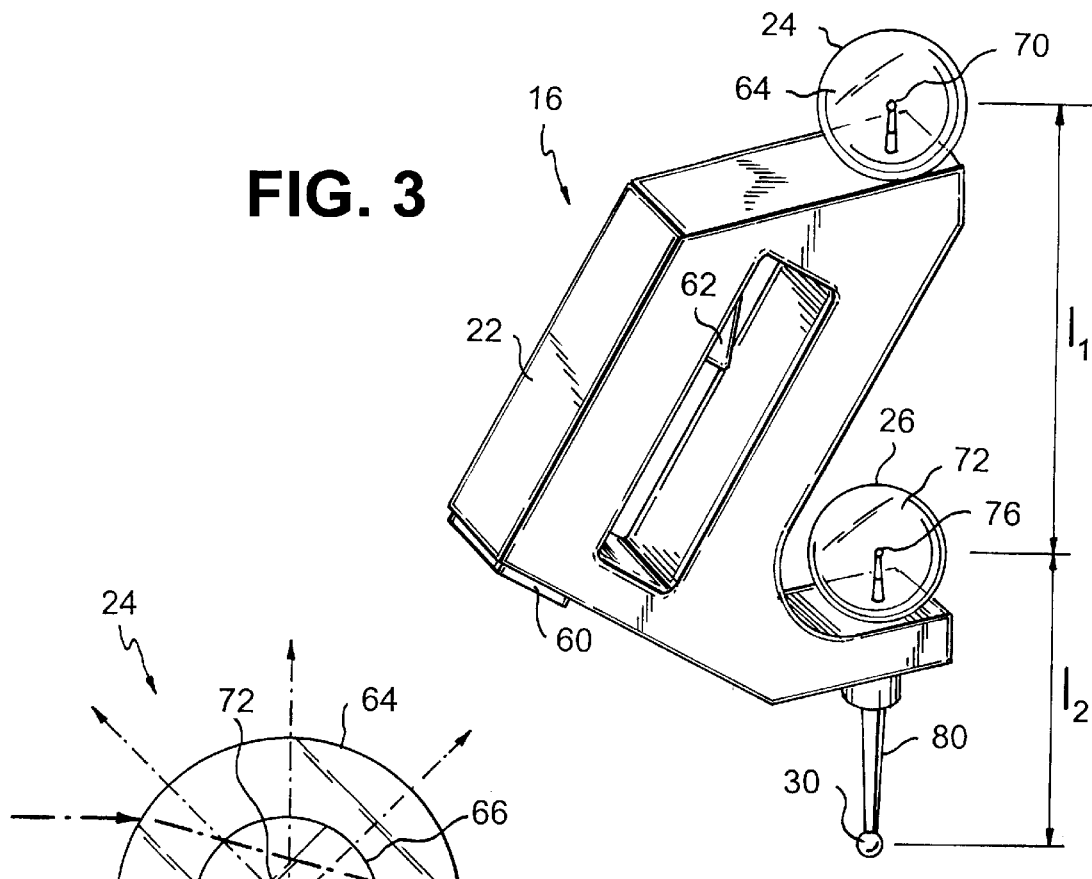
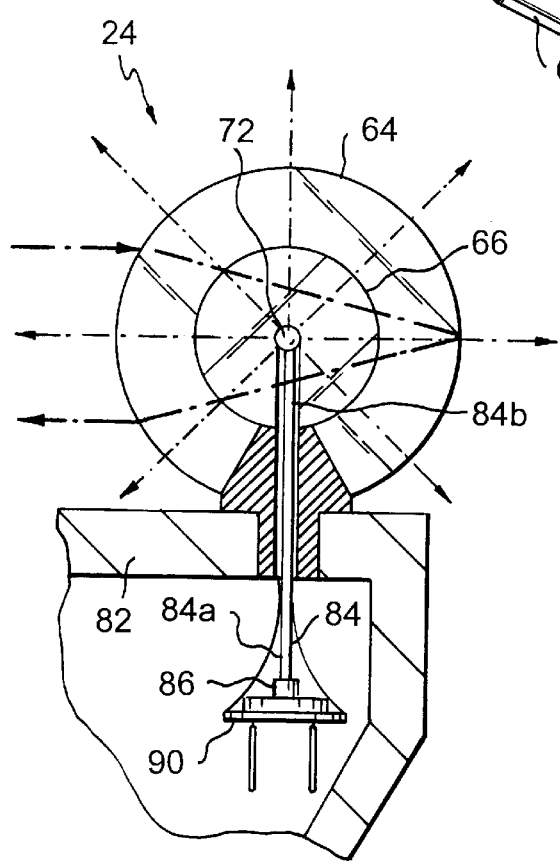
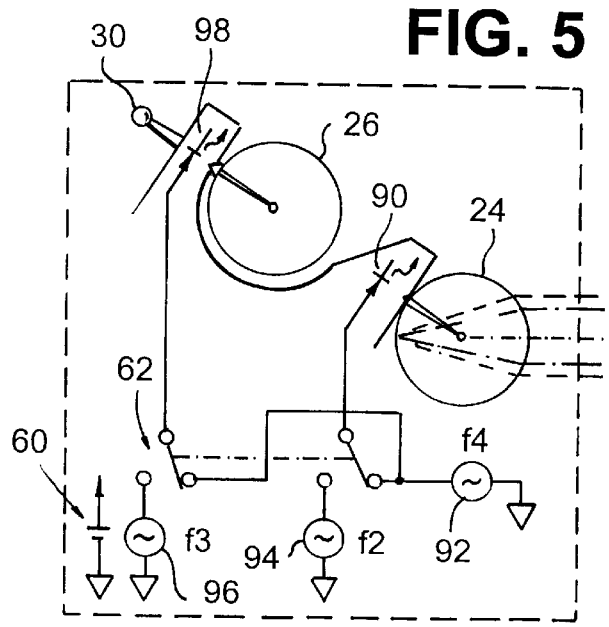
FIG. 3
FIG. 4
FIG. 5

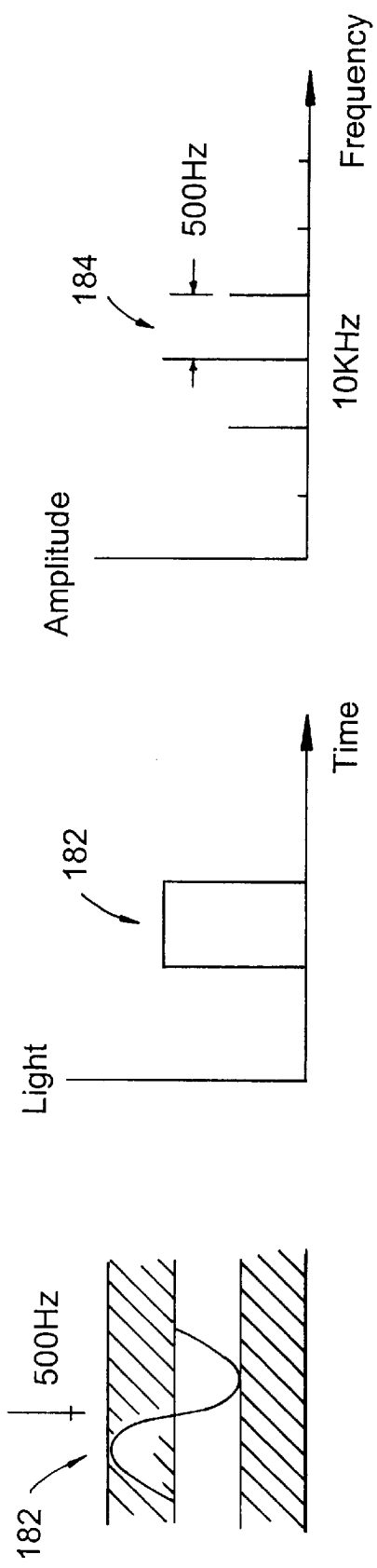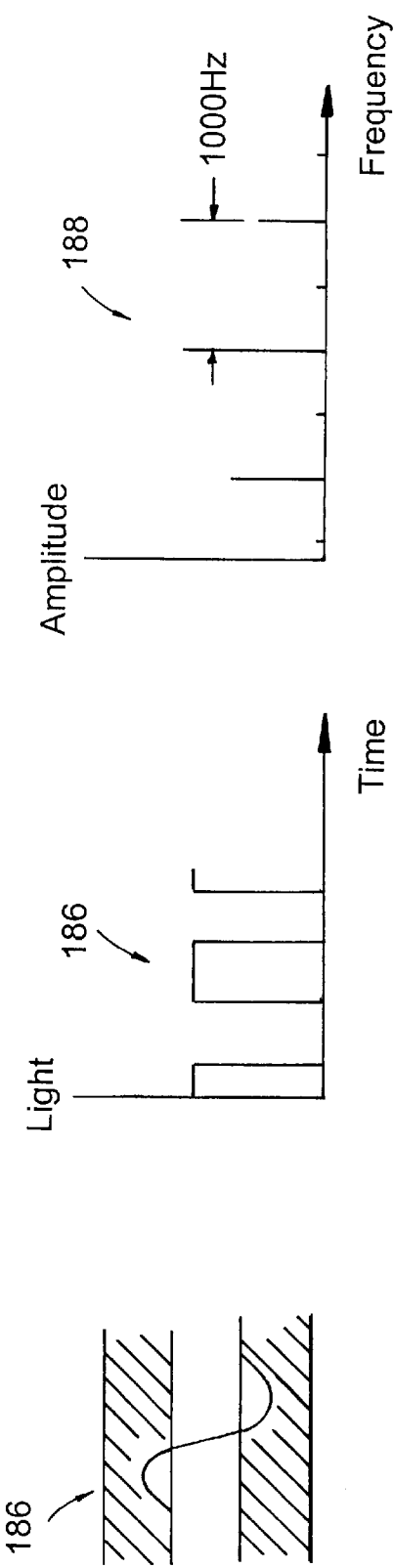

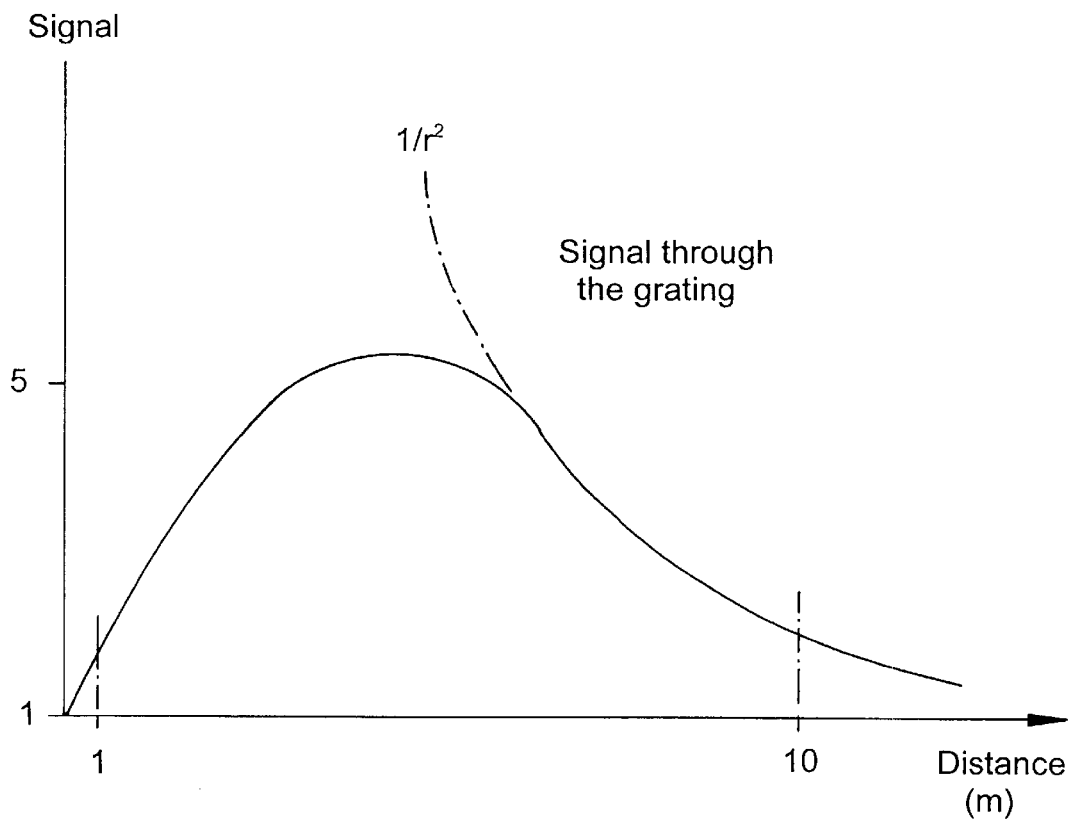
FIG. 13
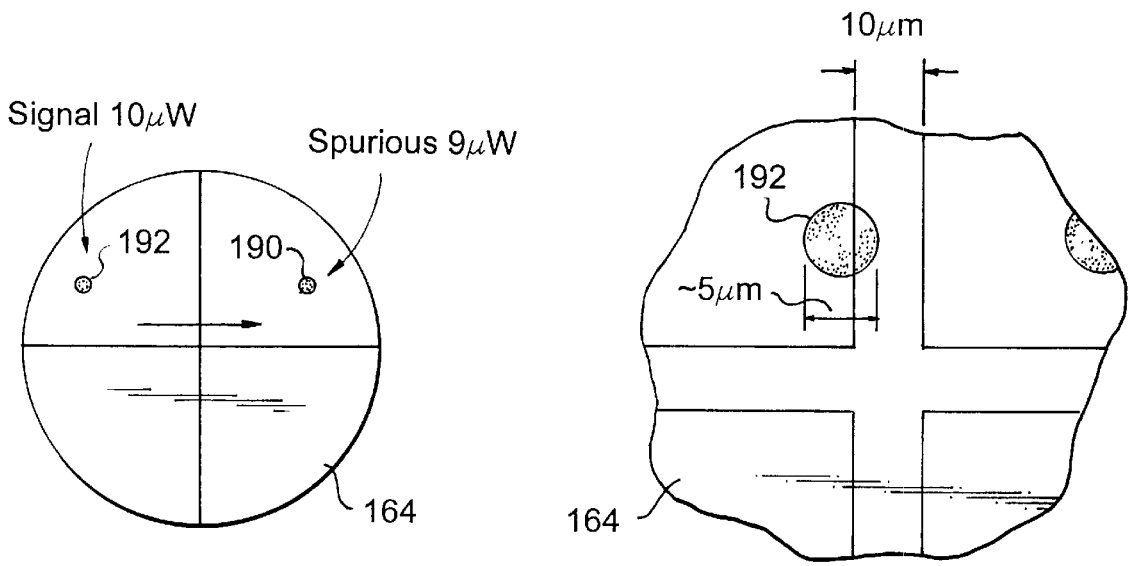
FIG. 14A
FIG. 14B

FIG. 15B
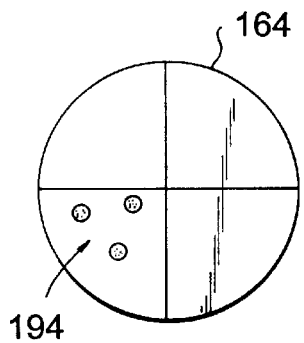
FIG. 15A
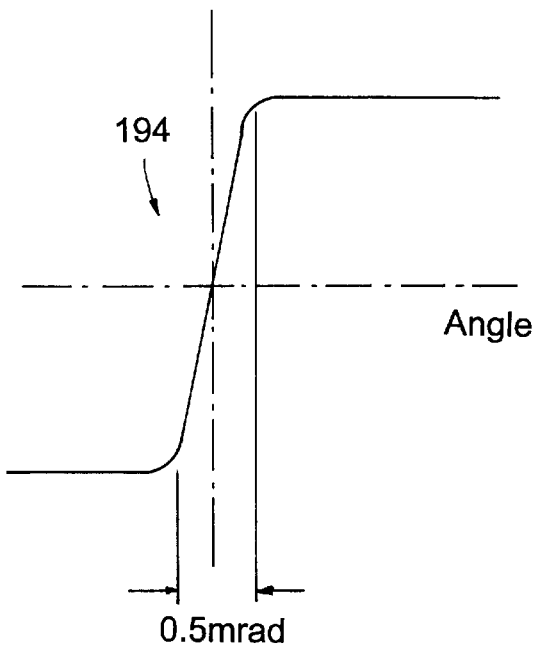
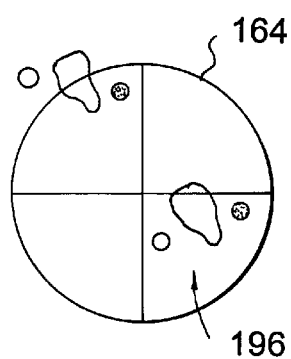
FIG. 16A
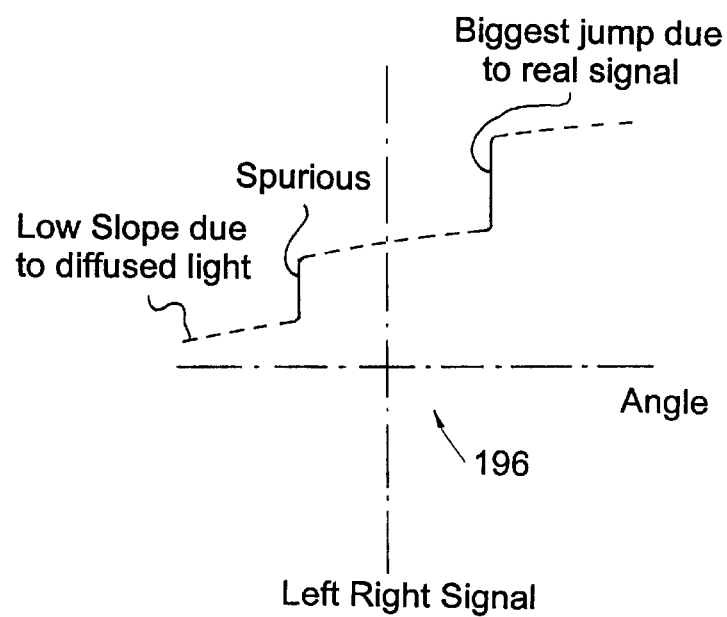
FIG. 16B

OPTICAL COORDINATE MEASURING MACHINE

This application claims priority from U.S. Provisional Application No. 60/003141, filed on Sept. 1, 1995.

BACKGROUND OF THE INVENTION

This invention generally relates to tracking apparatus and to methods for tracking articles. More specifically, the present inventions relates to such apparatus and methods that are well suited for use in an optical coordinate measuring machine.

Optical coordinate measuring machines are used to measure large objects with high accuracy. The need for this type of measurement is found in many industries such as automotive, machinery, construction, robotics and aerospace.

In an optical coordinate measuring machine, a hand held probe is traversed along an object being measured. A series of transceivers are located in fixed positions around that object, and each transceiver, using an amplitude modulated laser beam, measures the distance between the transceiver and the probe. The distances measured by the various transceiver are processed to determine the location of the probe as it moves around the object being measured, and, from this, the precise contour of that object.

Typically, these transceivers include systems for tracking the probe so that the transceivers are able to aim their laser beams directly at the probe. In many optical coordinate measuring machines, an extremely high degree of precision—on the order of micrometers—is desired. In order to achieve this high degree of precision, it is important that the transceivers—or, more specifically, the tracking systems thereof—track movement of the probe with a correspondingly high degree of accuracy. The tracking system needs to be able to locate the retroreflector (article) quickly anywhere in a large volume. The tracking system is designed to lock a light beam onto a corresponding retroreflector to a high degree of precision so that offset errors are minimized. Minimizing the offset errors is important so that when one goes to measure the actual distances to the probes using the tellurometer principles, one gets the most precise measurement. The tracking system needs to be able to distinguish a real image of the beacon form a "ghost", reflected, spurious, or background image.

SUMMARY OF THE INVENTION

It is an object of the invention to provide an apparatus to distinguish real beacon signals from ghost, reflected, or spurious images of the beacon.

It is an object of the invention to provide a means for tracking a portable hand article/probe in a large volume.

It is an object of the invention to provide a robust optical means for an object/article quickly in a large volume (scan region) and then lock onto that object with a fine tracking beam (which is ultimately the same measurement beam for the optical CMM).

It is an object of this invention to provide coarse and fine tracking systems that may provide tracking accuracy of 1 mrad, and if better tracking is desired, for instance 1 μrad accuracy, the tracking unit may be provided with an additional very fine tracking system.

An object of this invention is to improve tracking systems for optical coordinate measuring machines.

Another object of the present invention is to provide a tracking system with both a coarse tracking means, which is operated to direct a light beam approximately onto a moving article, and a fine tracking means, which is operated to direct a light beam substantially directly onto the article.

A further object of this invention is to us a coarse tracking means to find an article, and then to use a fine tracking means to direct a light beam directly onto the article.

These and other objections are attained with an apparatus for directing a light beam onto a moving article and comprising first and second mirrors for directing the light beam in an adjustable direction, first and second motors connected to the first and second mirrors to move those mirrors, and a tracking system connected to the first and second motors to operate those motors to move the first and second mirrors to maintain the light beam directed at the article as the article moves.

Preferably, the tracking system includes coarse and fine tracking means. In order to have a versatile system you want the ability to locate the measuring probe quickly and easily anywhere in the defined volume. The coarse alignment accomplishes this. Once the tracker is aligned in a coarse sense, the fine alignment detector will see the retroreflected, tracker measurement, light beam sent out by the tracker (transceiver).

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 3 and 4 show a probe of the optical coordinate measuring machine.

FIG. 5 is a schematic drawing of the electronic control circuit of the probe.

FIGS. 11A–11C illustrate how the frequency of a light beam incident on the graticule may vary as the graticule vibrates.

FIGS. 12A–12C illustrate how the frequency of a light beam incident on a different part of the graticule may vary as the graticule vibrates.

FIG. 13 shows how the intensity of the probe beam on a sensor may vary as the distances between the probe and the sensor changes.

FIGS. 14A and 14B show various light beams on various parts of a quadrant sensor that may be employed in the present invention.

Figures 15A and 15B illustrate how the output signal of a sensor may change when the light beam on the sensor moves from one quadrant to another quadrant of the sensor.

FIGS. 16A and 16B show how ambient light and spurious light may affect the output from the sensor.

DETAILED DESCRIPTION OF THE PREFERRED EMBODIMENTS

Figure 1:
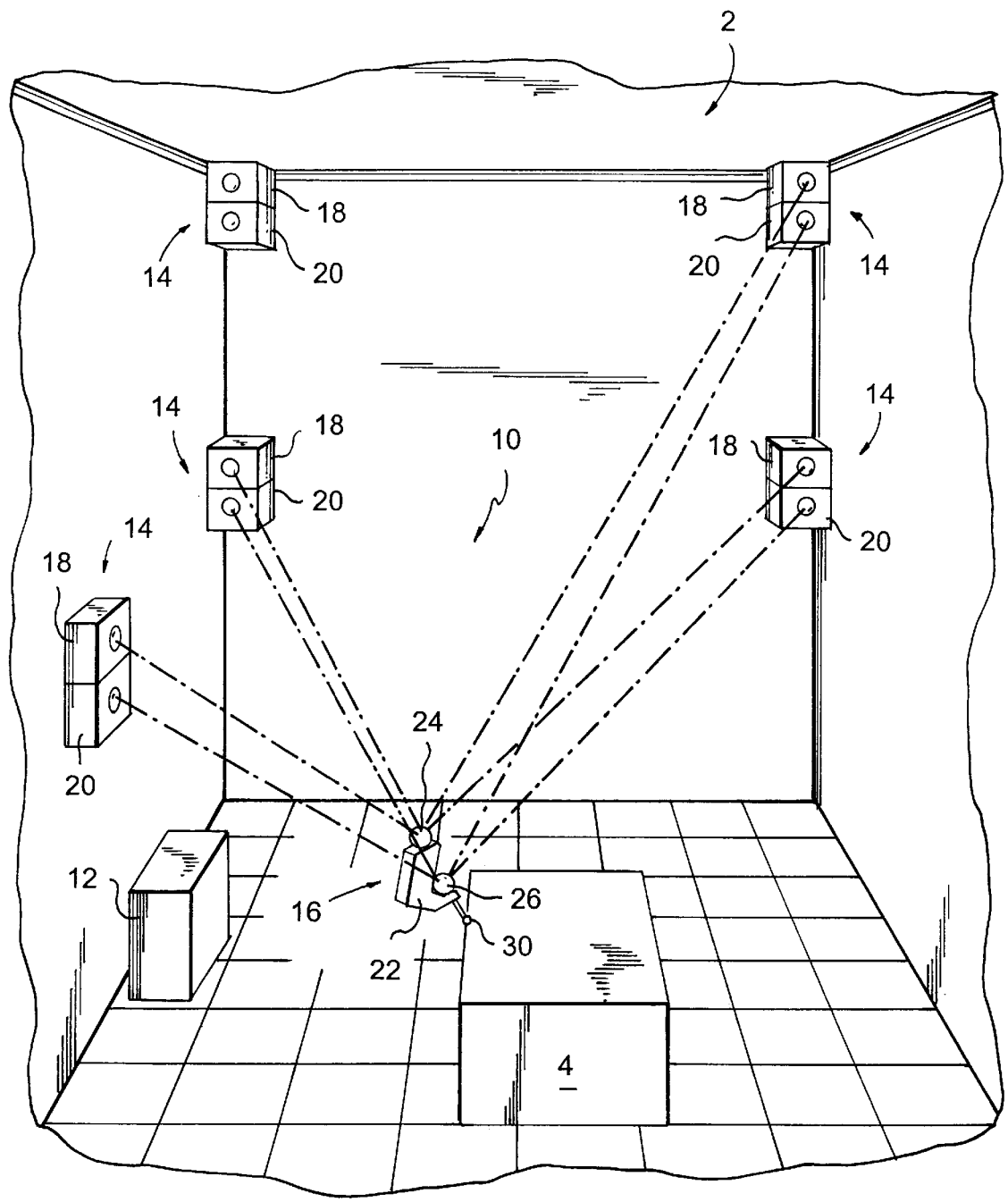
FIG. 1 generally illustrates an optical coordinate measuring machine.

FIG. 1 illustrates a room 2, an object 4 in that room, and an optical coordinate measuring machine 10 for measuring the contour or dimensions of that object. Machine 10 comprises central unit 12, a first set of transceiver assemblies and probe 16. Each transceiver assembly 14 includes first and second transceivers 18 and 20; and probe 16 includes a base 22, first and second retroreflectors 24 and 26, and tip 30.

In general, an amplitude modulated laser beam is generated in central unit 12, and transmitted to each of the transceivers 14 and 16, and split into a series of component beams. Each of theses component beams is transmitted to a respective one of the transceiver assemblies 14, where the beam is further split among the transceivers 18 and 20 of the transceiver assembly. Each transceiver 18 then transmits a respective one laser beam to retroreflector 24, which partially reflects the beam back to the originating transceiver 18. Likewise, each transceiver 20 directs a respective one laser beam to retroreflector 26, which partially reflects the beam back to the originating transceiver 20. It should be noted that before the amplitude modulated laser beam is transmitted from the transceivers tot he retroreflectors, it is necessary that the beacon generated in each of the retroreflectors be located and the coarse alignment completed.

The location of each of the transceivers 18 and 20 in room 2 is known. In operation, tracking systems of the transceivers are used to find the retroreflectors; and after those retroreflectors are found, the transceivers transmit laser beams to the retroreflectors, which partially reflect the laser beams back tot he transceivers. By comparing the phase of the laser beam transmitted by each transceiver with the phase of the beam returned to that transceiver, the distance between the transceiver and the associated one of the retroreflectors 24 or 26 can be determined. From this data, and the known locations of the transceivers 18 and 20, the precise locations of the retroreflectors 24 and 26 can be found. This data can be used to determine the position of probe tip 30, since the centers of the retroreflectors and the probe tip are on a straight line, and the distances between the retroreflector and the probe tip are known. Additional features of an optical coordinate measuring machine are disclosed in U.S. Pat. No. 5,305,091, which is herein incorporated by reference.

Figure 2:
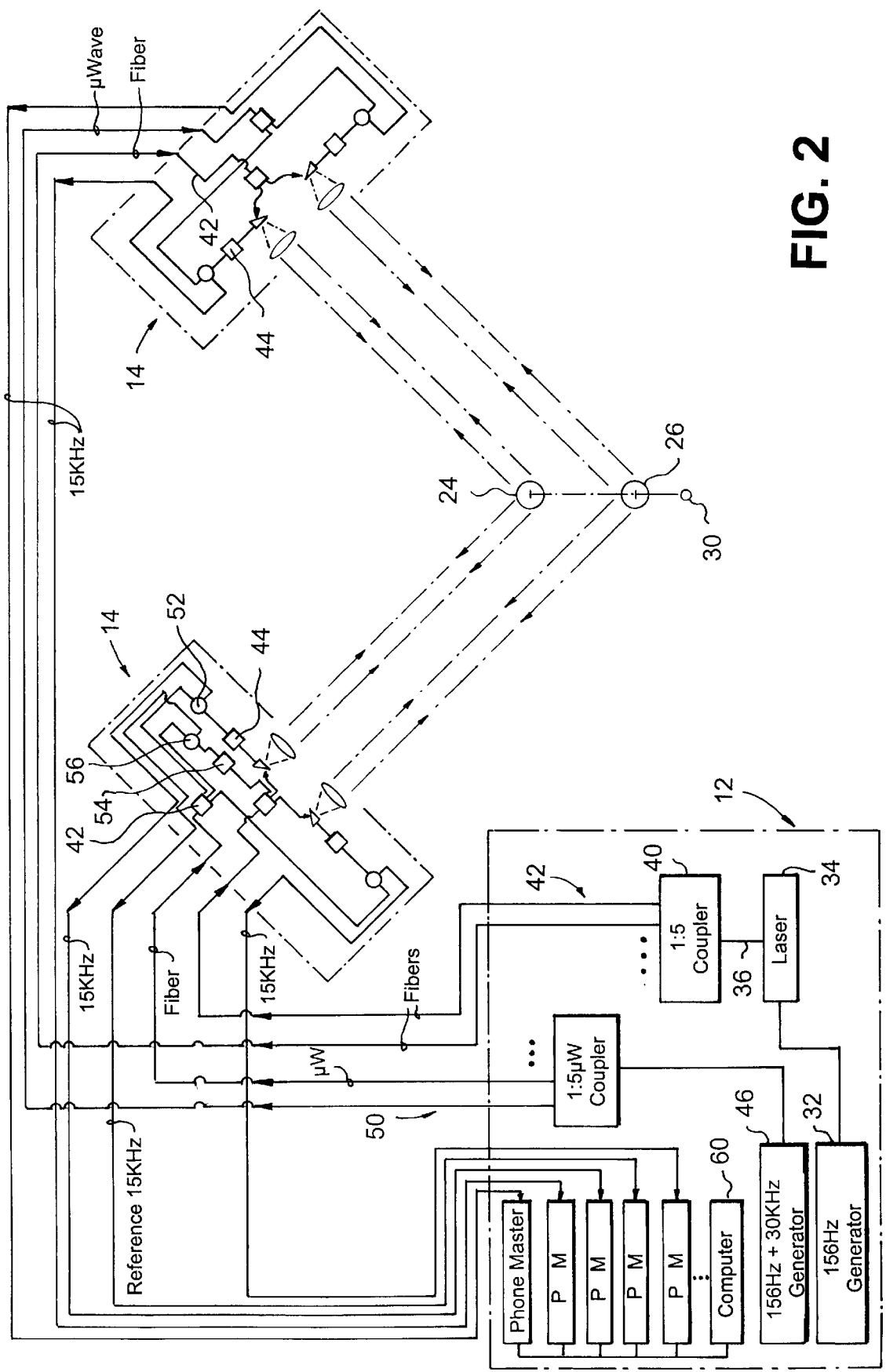
FIG. 2 is a more detailed schematic drawing of a central unit and of two transceiver assemblies of the optical coordinate measuring machine.

With reference to FIG. 2, central unit includes a 15 GHz microwave generator 32 that modulates a high speed laser diode 34 coupled to monomode optical fiber 36. After the laser beam is split in five by a one-to-five monomode star coupler 40, the split laser beams, conducted via fibers 42, exit the central unit and are brought to the remote transceiver assemblies 14.

In four of the five transceiver assemblies 14, the laser light from the input optical fiber 42 is further split in two, and two independent transceivers send a laser light to retroreflectors 24 and 26. In each transceiver, the laser light returned by the retroreflector is focused on a high speed photodiode 44, producing a weak 15 GHz electrical signal. The phase of this returned 15 GHz signal, when compared to the phase of the initial 15 GHz signal of the microwave generator 32, contains the desired distance information and preferably is precisely measured.

In order to find this phase difference, the power from a second microwave generator 46 in the central unit 12, running at 30 kHz above 15 GHz, is split in five and sent via microwave cables 50 to the five transceiver assemblies. This microwave power is applied to the local oscillator side of a high frequency mixer 52, while the signal from the photodiode 44 of the transceiver is sent to the RF side of the mixer 52. At the same time, an intermediate frequency of 30 kHz, containing the initial 15 GHz phase information, is generated and, after amplification, sent back to the central unit.

In one of the transceiver assemblies, the light from the input optical fiber 42 is split in three. The third of these three split beams is not sent to a retroreflector, but instead, that light is sent directly to a photodiode 54. The 15 GHz signal from this diode 54 is mixed, at mixer 56, with the 15 GHz plus 30 kHz microwave power to produce a reference 30 kHz frequency signal, the phase of which is independent of the position of probe 20. The phase difference between this reference signal and the 30 kHz signal from each of the ten transceivers 14 and 16 is measured in the central unit 12 using Fourier transform techniques. These measured phase differences are passed to a computer 60 that uses this data to calculate the distance from each of the transceivers to the associated retroreflector. Using triangulation techniques and the known location of the tracking units, the positions of the retroreflectors and of the probe tip 30 are then calculated from this distance data.

Further details of probe 16 are shown in FIGS. 3 and 4. With reference to these Figures, the probe, in addition to base 22, retroreflectors 24 and 26 and tip 30, includes a rechargeable battery 60 and a switch 62 that is used to activate or initiate operation of the probe. Further, retroreflector 24 includes outside sphere 64, inside sphere 66 and light source 70; and retroreflector 26 includes outside sphere 72, an inside sphere (not shown) and light source 76.

Tip 30 is mounted to probe 20 by stem 80; and, as discussed above, the two retroreflectors 24 and 26 and the measuring tip 30 of the probe are precisely in line with a known distance between each of these elements. This configuration is preferred because the retroreflectors themselves are too large to measure inside a small recess in the object or piece to be measured, a difficulty that is effectively solved by using a small probe tip.

Light sources 70 and 76 are provided to facilitate coarse tracking of the probe 20. Each of these light sources emits a light or beacon modulated at a unique frequency. As discussed in greater detail below, transceivers 18 only respond to (and track) the beacon from light source 70, while transceivers 20 only respond to (and track) the beacon from light source 76.

The retroreflectors 24 and 26 of probe 16 are substantially identical, and thus only retroreflector 24 will be described herein detail. With particular reference to FIG. 4, sphere 64 is made of a material that is transparent to the light from transceiver 18 and to the light from light source 72. Second sphere 66 is inside and concentric with sphere 64. Inside sphere 66 is made of a material having an index of refraction higher than the index of refraction of outside sphere 64, and the radius of sphere 66 is chosen to minimize the spherical aberration of the retroreflector.

Retroreflector 24 is mounted to probe 20 using base 82. In order to form light source 72, an optical light guide 84 is inserted via a hole drilled in base 82 and in inner sphere 66. The light guide 84, by way of example, can be a 1 mm diameter glass rod with a silver coating on its outside surface. One end 84a of the light guide is optically coupled to the emitting area 86 of light emitting diode 90 using an index-matching optical cement. The other end 84b of light guide 84 is ground to a diffusing surface and forms light source 70. Light rays are emitted by light source 70 in an approximately omnidirectional pattern.

The electrical circuit in probe 16 is shown in FIG. 5. Rechargeable battery 60 powers three oscillators 92, 94 and 96 at frequencies $f_4$, $f_2$ and $f_3$ respectively. In the non-activated position of switch 62, oscillator 96 is connected to light-emitting diode 98, and oscillator 94 is connected to light-emitting diode 90. When a measurement is required, switch 62 is activated, causing both light-emitting diodes 90 and 98 to modulate at a frequency of $f_4$. The light emitted by diodes 90 and 98 is transmitted to transceivers 14 and 18 and used by the transceivers, in a manner more fully described below, to track movement of the probe.

Figure 6:
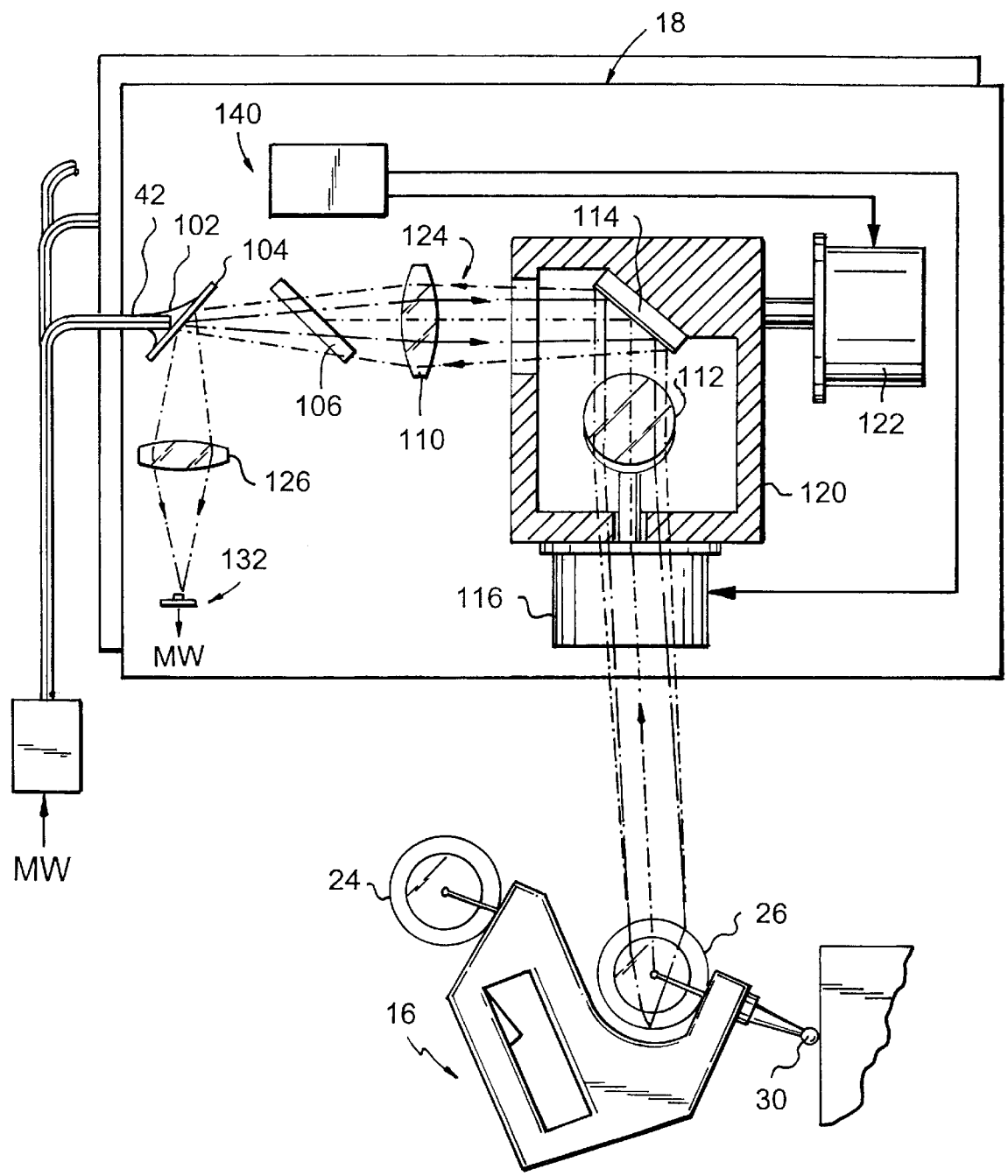
FIG. 6 shows a transceivers of the optical coordinate measuring machine.

Further details of one of the transceivers are illustrated in FIG. 6. Inside each transceiver, the tip of optical fiber 42 is aligned with a small aperture in mirror 102 and held in place via index-matching optical cement 104. The output beam 106 from fiber 42 is collimated by lens 110 and directed toward a retroreflector 24 or 26 using steering mirrors 112 and 114. Mirror 112 is mounted on motor 116, and mirror 114 is mounted on frame 120, which is rotated by motor 122.

Beam 106 is directed by mirrors 112 and 114 to retroreflector 24 or 26, and is reflected by the retroreflector as beam 124. The return beam 124 is itself reflected by the mirrors 112 and 114, is focused on lens 110, and is directed onto mirror 102. Because of aberrations in the retroreflectors, beam 124 can not focus to the diffraction-limited aperture size in mirror 102 and thus most of the energy in beam 122 is reflected by mirror 102 and focused by lens 126 onto a high speed photo-detector 132.

Each transceiver also is provided with a coarse tracking unit or system 140 to keep laser beam 106 pointed at the appropriate retroreflector as probe 16 is moved around the measuring volume by the operator. In addition, when line-of-sight is lost—that is, when the retroreflector moves to a location at which the laser beam from the transceiver is not received by the retroreflector—or upon starting the optical coordinate measuring machine 10, the tracking unit 140, preferably, quickly reacquires the retroreflector wherever it is and wherever the tracking unit is currently pointing. Because of this latter requirement, a wide scan angle, preferably 180°, on both axes of mirrors 112 and 114 is necessary for the tracking sensor.

The trackers maintain line-of-sight between the tip of the optical fiber and the probe retroreflector. The reason that the tracking is used is to increase the signal strength. In theory, the optical CMM can be implemented without tracking but the very high optical losses make the approach impractical. Preferably the trackers are packaged as dual units because there are two retroreflectors on the probe. There are two retroreflectors on the probe because one needs two points to establish a line. If one is to have a probe that can be oriented in any position to establish a point contact, one needs this geometry.

Preferably, the tracking system includes both coarse and fine tracking means of subsystems. Coarse alignment/tracking is accomplished with a beacon from the probe or article. Fine alignment/tracking is accomplished with a retroreflected beam originating from the transceivers.

Figure 7:
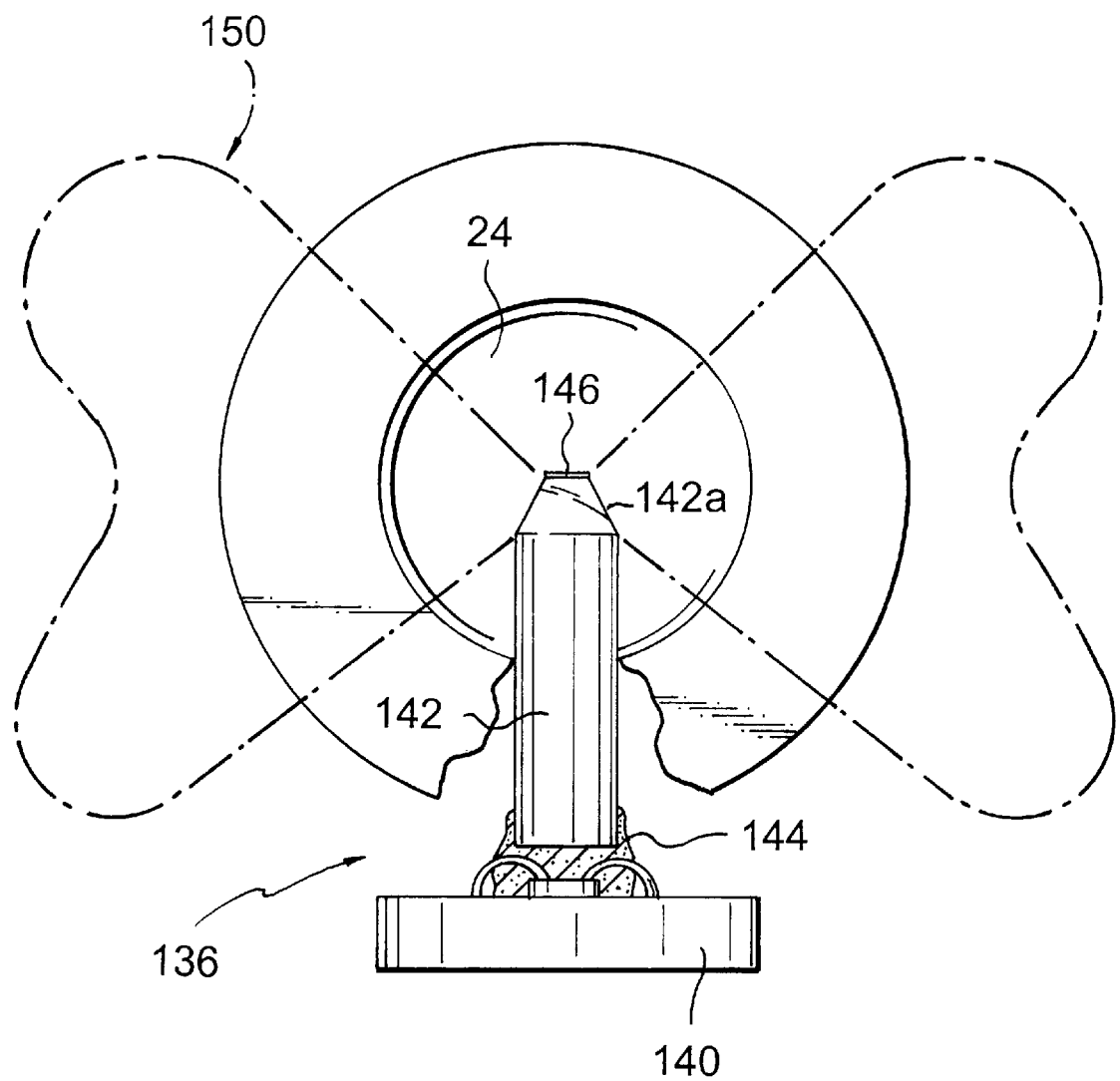
FIG. 7 shows a beacons of the probe of the optical coordinate measuring machine.

With reference to FIG. 7, a blinking infrared beacon 136 is installed in the center of each spherical retroreflector. Preferably, the beacons of the two retroreflectors blink at different rates so that the tracking systems 140 can differentiate between the two beacons; and, for example, the two beacons may blink at 10 and 12 kHz respectively. More particularly, a high power light emitting diode (100 mW LED) 140 is coupled to a 1 mm diameter silver coated plastic light pipe 142. The 1 mm pipe 142 is directly glued with U.V. curable index matching glue 144 on the 0.7×0.7 $mm^2$ LED. Preferably, the light pipe end 142a is designed to uniformly diffuse the light in $4\pi$ steradians. The sides of the light pipe are depolished and a dot 146 of white paint is put on the end of the pipe. Without this white paint, most of the light would be forward scattered in the direction of the top pole, where the retroreflector is blind due to the pedestal.

The white paint produces a cone of shadow that is tailored to the blind angle of the retroreflector. Light diffused by the paint 146, mostly in the backward pipe 142. The radiation pattern of this design is shown at 150 in FIG. 7. No light is diffused toward the poles. This is acceptable because the poles do not retroreflect the laser beam. For example, the coating on the outside of the retroreflector 24 may be R=33% at 1.3 $\mu$m, and preferably the retroreflector also has a large transmission at 890 nm, the wavelength of the beacon. The hole in the glass may be made by ultrasonic drilling. The laser beam incident on the retroreflector is 1 cm in diameter, and in the center of the sphere., that diameter is reduced to 6 mm (as shown in FIG. 4). The 1 mm hole therefore blocks about 20% of the light.

Figure 8B:
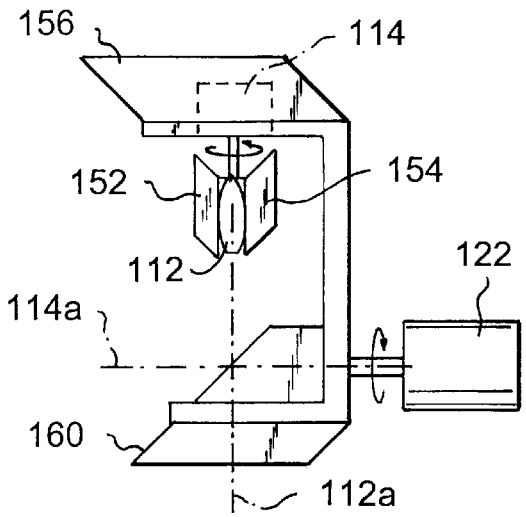
FIG. 8A–8C illustrate a coarse tracking system that may be used in the transceiver of FIG. 6.
Figure 8A:
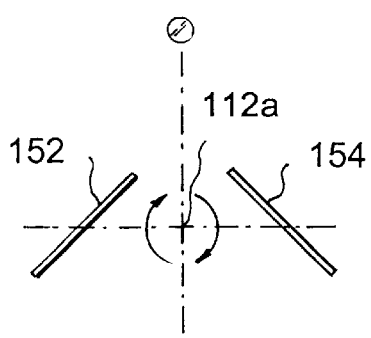
Figure 8C:
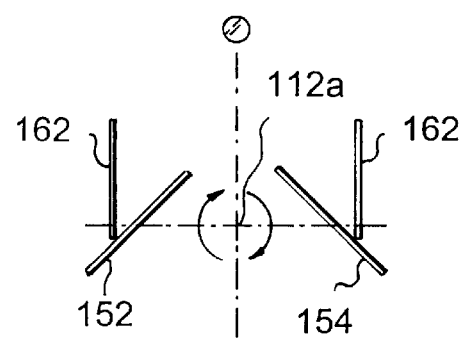

FIGS. 8A–8C show a coarse tracker. The coarse tracking finds the beacon signal and orients the transceiver so that it is within the field of view of the fine tracking system. The requirement for wide angle tracking may be satisfied by an arrangement of two large area photodiode panels mounted at 45° on each side of the axis of rotation 112a and 114a of each of the steering or tracker mirrors 112 and 114 and rotating with that mirror. Each axis has its own set of photodiodes. In FIGS. 8A–8C, the panels associated with mirror 112 are referenced at 152 and 154, and the panels associated with mirror 114 are referenced at 156 and 160. In operation, the motors 116 and 122 are turned until the probe light power detected by the two photodiodes associated with each tracking mirror are equal. The mirror should then be pointing at the probe. In order to distinguish the relatively weak probe light from the much stronger ambient light, preferably the electric signals from the diodes 152, 154, 156 and 160 are filtered and only the power of the signal that oscillates at 10 kHz is considered. This filtering may be done by a switch capacitor filter, or if better performance is preferred, a digital signal processing (DSP) chip doing a Fourier analysis can be used.

Assuming a coupling efficiency of 50% between the probe LED 140 and the diffuse light pipe 142, the probe light power on a 8 cm² photodiode ten meters from the probe is: 100 mW×0.5×8 cm²/(4π1000² cm²)=32 nW. The sensitivity is 0.5 A/W and the intrinsic noise is 10–13 A/Hz$^{1/2}$. An operator moving across the room will only change the light level on the detector relatively slowly, and thus a bandwidth of ten hertz is sufficient. As a result, in a 10 Hz bandwidth, the signal-to-noise ratio is 95 db. A low noise transimpedance amplifier can amplify this weak signal while adding only 0.3×10–13 A/Hz$^{1/2}$ to the noise, a negligible amount.

In order to reduce the interference caused by ambient light, an optical filter that reduces visible radiation but which is transparent to infrared radiation may be installed in front of the photodiodes 152, 154, 156 and 160. The affect of interference from ambient light could also be reduced by using better optical and electrical filters, overdriving the probe LED 140, with a reduced duty cycle, improving the coupling efficiency between LED 140 and light pipe 142, or emitting more light from the probe. In addition, a high power laser diode could be used in place of the LED 140. A very narrow optical filter in front of the detector could then greatly improve the signal-to-noise ratio.

The tracking accuracy of this system 140 is limited by the probe light that is diffused from the walls, the ceiling and the floor of the measuring volume or room 2. Because of the wide field of view of the photodiodes 152, 154, 156 and 160, the signal incident n each of these diodes is due not only to the light coming directly from the probe 16 but also from the light being scattered from everywhere in the room which, of course, is also modulated at 10 kHz. For example, in a normal, fairly white room, at a distance of ten meters, 66% of the light incident on one of the photodetectors 152, 154, 156 and 160 is scattered light and only 33% of the light comes directly from the probe 20. Even under these conditions, however, the tracker still points the laser beam in the direction of probe 16. This is because the diffuse light is rather uniform and the direct light from the probe 16 is strongly peaked in the direction of the probe.

However, if half the room 2 is white and the other half of the room is black (which may result if, for example, the room 2 has a white ceiling and a dark floor), the pointing error can be up to +/–15°. Blinds 162 installed on the detectors, as shown on FIG. 8C, reduce this error to +/–5° by reducing the field of view of each detector, and therefore reducing the amount of scattered light detected by each detector. Preferably, a small amount of diode surface is left past the blinds so that the tracker will still turn toward the probe 16 even if the probe is significantly to one side or the other side of the tracking mirror. This system 140 thus operates very well as a coarse tracker that can find the probe 16 anywhere in a very large field of view and that turns the mirrors 112 and 114 until the probe is within 5° of the laser axis.

Figure 9:
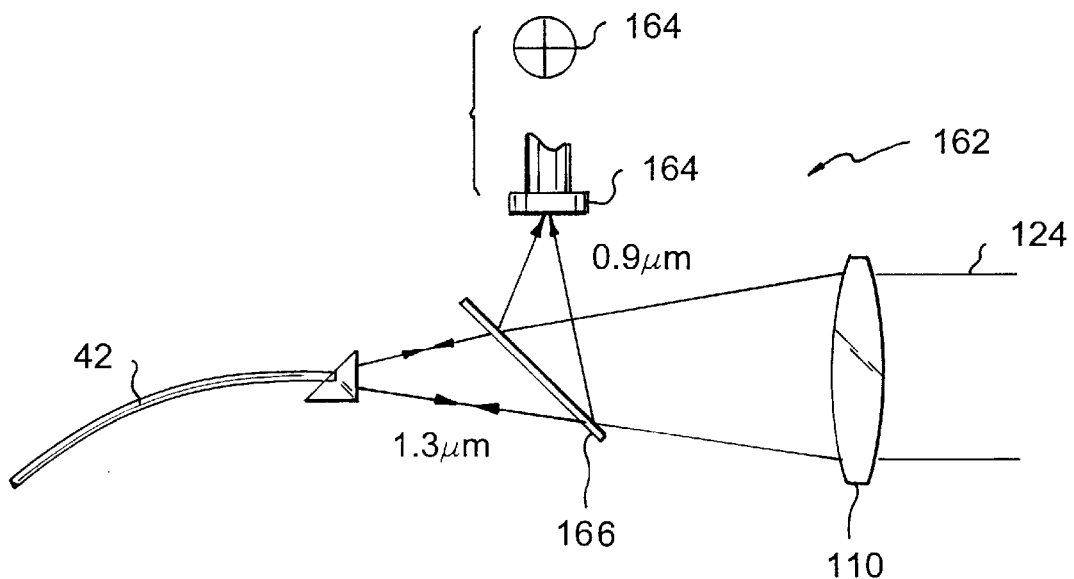
FIG. 9 shows a fine tracking system that may also be used in the transceiver.

FIG. 9 shows a fine tracker system 162 comprising a quadrant detector 164 at the focus of the collimating lens. A dichroic mirror 166 transparent at 1.3 μm but reflective at 890 nm is installed just past the collimating lens. This mirror 166 does not affect the laser beam 106, but light from the probe 16 is reflected to the quadrant detector 164. For Example, the detector 164 may have a 1 cm diameter, and the focal length of the collimating lens 110 may be 5 cm, giving a field of view of 12° (+/–6°) with some vignetting (smaller clear aperture for off axis angle) from the tracking mirror assembly. If the fine tracking system 162 does not detect the probe 16 after the coarse tracker is balanced, a circular search with a swat of 12° around the initial 12° field of view may be made to find the probe. Once the light from the probe 16 is detected on the quadrant detector 164, the motors 116 and 122 are turned until the power or intensity of the light is equal in all four quadrants of the detector.

Signal-to-noise considerations for the fine tracking system 162 are similar to those for the coarse tracker. The situation for the quadrant detector 164 is better, though, because the intrinsic noise of this detector is only 1.5×10–14 A/Hz$^{1/2}$ per quadrant (due to the fact that the quadrant detector has a smaller surface than the solar panels 152, 154, 156, and 160), while the light collecting surface of the quadrant detector is 6 cm² (compared to the 8 cm² surface are of the panels 152, 154, 156, and 160). The intrinsic signal-to-noise ratio of the quadrant detector 164 is therefore five times better than the intrinsic signal-to-noise ratio of the panels 152, 154, 156, and 160. Filtering may be used to limit the noise from the ambient light, but less filtering may be needed with the quadrant detector than with the coarse tracking system due to the narrower field of view of the fine tracking system or sensor.

Scattered light within the smaller field of view of the fine tracking system 162 may still adversely affect tracking, however. This is because, in part, in the focal plane of the lens 110, the light from the probe 16 will be imaged to a very small point, but the scattered light from a white wall, for example, will be imaged as a larger spot of light. If a graticule made of alternate black and transparent lines is moved in the focal plane in front of the detector 164, the small image of the light or beacon from the probe 16 will flash on and off and the extended image of the scattered light, while remaining constant, will be attenuated by a factor of two. The graticule provides a means for identifying the real signal beacon from ghost or reflected beacon signals. With the use of the graticule, the spectrum of the electric signal from the detector 164 will contain side bands separated from the carrier frequency by the frequency at which the lines of the graticule pass in the focal plane. The energy in these side bands is from the 10 kHz beacon only, scattered light does not contribute to that energy.

Figure 10A:
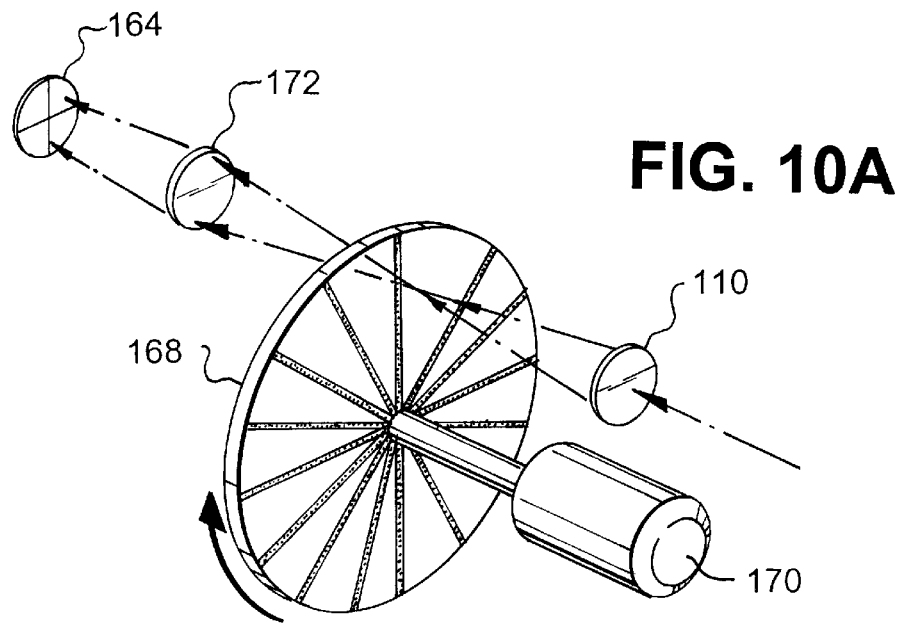
FIG. 10A shows a first graticule that may be employed in the fine tracking systems.

As shown in FIG. 10A, this graticule may be, for example, a wheel 168 with radial black and transparent lines that are spun, by motor 170, in front of the detector 164. Preferably, for optimum tracking, the detector 164 is also at focus of the beacon light. Thus, with this arrangement, a relay lens 172 is used to produce a second focal plane. As an alternative, and simpler, example, shown in Figure 10B, a graticule made of parallel lines optically generated on a piece of film 174 may be directly glued on the face of the quadrant detector 164. The emulsion side of the film 174 may be glued against the detector 164 to avoid having a gap corresponding to the thickness of the film between the graticule and the detector.

Figure 10B:
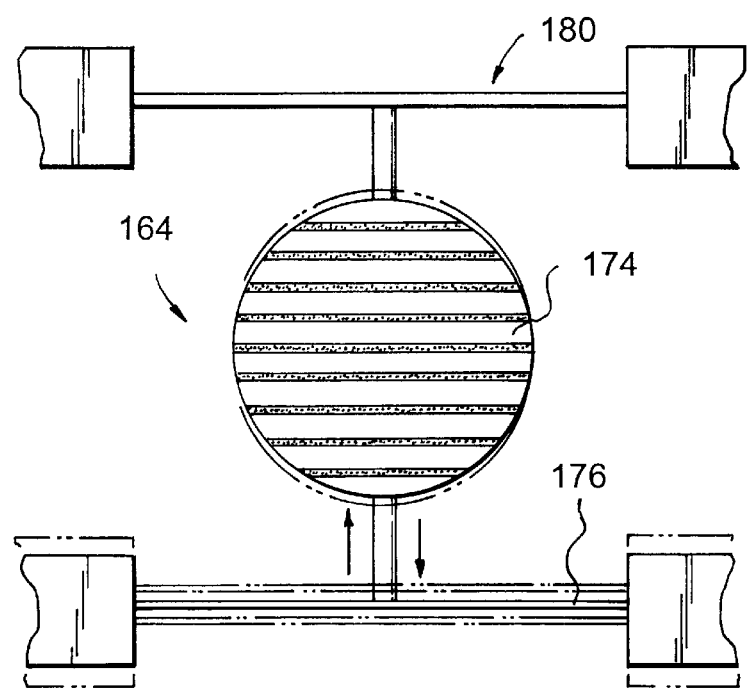
FIG. 10B shows a second graticule that may be used in the fine tracking system.

With the arrangement illustrated in Figure 10B, the lines of the graticule 174 are at 45° to the axes of the detector 164, and the middle of the quadrant detector is in between two black lines on the graticule. This arrangement optimizes tracking accuracy. The quadrant sensor 164, with the graticule glued on it, is vibrated, in a direction perpendicular to the direction of the lines on the graticule and perpendicular to the direction of the axes of the optical light beam incident on the detector. This may be done by mounting the sensor 164 on a piezo disk 176 that is driven resonantly with a sinusoidal electrical signal of 300 V. The piezo disk 176, in combination with an upper stabilizing linkage 180 and the stiffness of the mass of the detector 164, produce a resonant frequency off about 500 Hz. Any suitable means (not shown) may be used to drive the piezo disk 176.

With the arrangement shown in FIG. 10B, the modulation frequency of the probe beacon on sensor 164 depends on the position of the image of the beacon in the focal plane. As illustrated in FIGS. 11A–11C, if the focus of the probe beacon is just at the boundary between a black and a transparent line, as represented at 182 in FIGS. 11A and 11B, then the modulation frequency of that focus point on the vibrating sensor 164 is 500 Hz above and below the 10 kHz carrier frequency, as represented at 184 in FIG. 11C. However, as shown in FIGS. 12A–12C, if the probe beacon is focused on a spot that is in the middle of a line, or a gap, as represented at 186 in FIGS. 12A and 12B, then the modulation frequency is 1000 Hz, as represented at 188 in FIG. 12O. Thus, depending on the position of the spot of the probe beacon on the sensor 164, the frequency of the energy of the signal on that sensor smoothly changes from the side bands at 500 Hz to the side bands at 1000 Hz. This situation can be addressed by adding the signals in the 500 and 1000 Hz side bands and using this total as real signal strength for purposes the servo control for motors 116 and 122.

The widths of the lines on the graticule 174 are important. For example, the probe beacon may have a size of 1 mm. As a result, at a range varying from 1 to 10 meters, the image of the beacon in the focal plane of the collimating 110 lens varies from 50 to 5 $\mu$m. The image of a white scattering surface is much larger than that (and for instance has a size on the order of millimeters), but the image of a reflection on a shiny piece of metal will only be slightly larger than the direct image. Small lines are preferred on the graticule to provide good rejection of ghost images on shiny material; but if the graticule lines are too small, the probe may become invisible to sensor 164 when the probe is very close to the transceiver. As an example, the black lines on the graticule may be 25 $\mu$m wide, with 25 $\mu$m transparent gaps in between the black lines. With these dimensions, at a short range, the image of the probe beacon is larger than the lines on the graticule, so the strength of the modulated signal decreases. At far distances, the strength of the signal on the quadrant detector decreases as $1/r^2$.

The strength of the modulated signal versus the distance between the probe and the sensor 164 is plotted on FIG. 13. Normally, an electronic system capable of handling a 100 to 1 dynamic range would be needed for a probe range of 1 to ten meters, but with the vibrating graticule, this dynamic range is reduced to 15 to 1, substantially reducing the requirements on the electronic system. The preferred line spacing is the one that gives the same signal at minimum and maximum ranges. The design described above was tested and found to totally block the signal from scattered light on a white surface. Different pieces of metal with varying surface finishes were then tested. The signals from these surfaces were at least 20 time smaller than the direct signal from the probe, except for the signals from metal surfaces having brush or finely machined grooves all in the same direction. If the direction of these grooves is exactly perpendicular to the direction of graticule lines, a signal up to 30% of the real signal may be detected. Such a surface produces a line in the focal plane of the lens; and if this line, however long, is parallel to the graticule lines, it can produce a signal. A different graticule, such as chevrons, may be used to reduce or avoid this signal.

Small ghost signals have only a very small effect on the tracking using quadrant detector 164. With reference to FIGS. 14A and 14B, even with a spurious signal 190 almost as large as the real signal 192, the motors 116 and 122 of the tracker system will spin in the correct direction until the real signal hits a boundary between two quadrants of sensor 164. Then, the tracker motors 116 and 122 will continue to operate until the system reaches an equilibrium position, in which the true signal from the probe beacon is slightly shifted on the quadrant detector to one side of the boundary between the two quadrants. For example, the gap between neighboring quadrants on detector 164 may be 10 $\mu$m, and with a beacon spot 192 on the detector of 5 $\mu$m (at maximum range), the maximum tracking error would be 12.5 $\mu$m, corresponding to an angular error of 250 $\mu$rad. At a shorter range, the beacon spot 192 on detector 164 is bigger, giving a larger error, but the precision needed is less. Further for a small focal spot 192, the signal from sensor 164 may significantly change from very strong to the left to very strong to the right with a very small motion of the mirror, as depicted at 194 in FIGS. 15A and 15B.

Preferably, the vibrating graticule-detector assembly is maintained in the focal plane of the lens 110. When the range between the detector 164 and probe 16 varies from 1 to ten meters, this focal plane moves by 2.5 mm. An autofocus means (not shown) may be installed to move the detector assembly backward and forward by this distance. The distance data necessary to adjust the position of the sensor 164 is readily available. On power on, or when all trackers have lost line-of-sight, the strength of the beacon signal on the coarse tracking sensor of each transceiver 18 and 20 can be used to estimate the distance between the probe 16 and each transceiver. The strength of that signal varies as $1/r^2$, which is fast when the probe is close and slower when the probe 16 is at further distances. Hence, the focal plane of the lens 110 moves a lot at close range and then very slowly when the probe 16 is at longer ranges.

In order for the laser beam 106 to point exactly at the probe beacon, preferably the lateral position of the quadrant sensor 164 is adjusted to correspond to the place where the laser beam 106 is pointed. This can be done, for example, by having a laser sensitive screen with a 1 mm hole in the middle at a far distance. The probe beacon emits light through this hole. Small adjustments of the position of the sensor 164 may be made until the 1 cm laser beam 106 is centered exactly around the beacon. It should be noted that the tracking system would work well in almost any situation with a simple bare quadrant sensor 164 without any vibrating graticule.

An alternate approach is to make a quick 12° scan and record all the sudden changes in the power level of the light incident on the different quadrants of sensor 164 when a bright light spot goes through the boundaries between quadrants of the sensor, as shown at 196 in FIGS. 16A and 16B. The brightest point on the detector 164 can be detected, and the tracker can then turn the mirrors 112 and 114 in the direction of the beam that causes this brightest point.

As a further embodiment, a CCD camera may be coupled to a computer image analysis. One could use a slower blinking rate, synchronize the image refreshing rate to it and subtract two consecutive images from each other. Only the blinking beacon and blinking scattered light will show up if motion between two consecutive frames is less than a pixel. The beacon can then easily be separated from anything else by simply choosing the brightest pixel in the subtracted image. Alternatively, a laser diode could be used in place of the LED in the probe. A very narrow optical filter may be used to reduce ambient light to a negligible level.

As a common example, the brightest source of ambient light is a clear incandescent light bulb with a 2×10 mm$^2$ filament emitting 100 w, 5 w/mm$^2$. The probe beacon is only 100 mw/mm$^2$. A 10 nm bandwidth filter would allow almost all the beacon light through. The light bulb emits light in a very large 1000 nm band, peaking in the yellow part of the spectrum. Less than 1/100 of the light would be detected on the filter, making the probe beacon the brightest source. Again, choosing the brightest pixel in the field of view would give the correct position of the beacon. In this arrangement, an interference filter will work well because the light always comes from the same direction +/−6°. The LED beacon with some infrared filtering would be dimmer than ambient light sources. The computer searches for a spot having about the correct size and brightness. After finding a few candidates, the computer compares the angular positions of all these point with ones found by the other trackers and narrows the search to only a few points. Sending the laser beam 106 to each of these points will indicate if the point is the retroreflector. Once identified, the correct point is tracked. If a line-of-sight is lost, the position of the retroreflector is still known from the other trackers and tracking can be maintained.

In order to reduce the work required of the computer 60, some analog processing may be used. For example, the signal from the CCD camera may be high pass filtered while a vertical line counter and horizontal pixel counter are ticking. If this filtered signal has a peak at the correct amplitude, the values of the counters are passed to the computer. A probe that is close to a transceiver produces a light spot on the CCD camera of the transceiver that is both bigger and brighter than the light produced by a probe that is further from the camera. Hence, the frequency response of the high pass filter can be adjusted to give a peak signal almost independent of probe distance. This COD embodiment gives the exact position of the probe, thus simplifying the design of the servo control for motors 116 and 122, compared to the embodiment employing quadrant detector 164. Improved resolution can be obtained by using four pixels as a quadrant sensor at the very end of the tracking sequence.

The coarse and fine tracking systems described above may be used to provide a tracking accuracy of 1 mrad. If better tracking is desired, for instance 1 μrad accuracy, the tracking unit may be provided with an additional, very fine tracking system. Two such very fine tracking systems, which use the laser light retroreflected from the probe 20, are described below.

In one very fine tracking system a small, circular dither having a diameter of about 200 μrad can be superimposed on the pointing of the beam. The returned signal is measured, and if the laser is not well centered, then that return signal will be variable with a sinusoidal waveform at the same frequency as the dither. The phase relationship of the signal variation with respect to the dither circular motion gives the direction of the pointing error, while the amplitude of the returned signal gives the magnitude of the error. When centered, the signal is constant. The dither is small and does not significantly affect the distance measurement. However, to minimize any such affect, the dither frequency may be synchronized with the measuring rate. The Fourier analysis will therefore be done on a sample corresponding to the exact time taken to dither one full circle. Possible measurement error due to different pointing (resulting from a small scratch or other damage on the retroreflector, for example) will be averaged out.

With a measurement rate of ten per second, preferably the dither is at 10 Hz. Also, constantly dithering the motors 116 and 122 driving the mirrors 112 and 114 will prevent these mirrors from sticking, which is problem that could otherwise limit the ability to turn the mirrors by a small amount, especially after many years of use. All these reasons make this arrangement very attractive. Instead of using motors 116 and 122 to dither mirrors 112 and 114, a mirror mounted on a central ball and tilted by electromagnets may be inserted in the optical path of return beam 124 to produce the dither.

Spherical aberrations of the retroreflectors 24 and 26 make the angles at which the beam 124 is returned by those retroreflectors sensitive to the pointing positions of the retroreflectors. Different specific angular positions of the retroreflectors cause return beam 124 to be imaged at different positions in the focal plane of the collimating lens 110. The light incident at angles larger than 1 mrad can not be coupled to the detector. This light could be directed to a quadrant sensor by an optical system such as the one shown at 200 in FIG. 17. A 1.3 μm narrow band filter (not shown) may be located in front of quadrant sensor 202 to reduce ambient light.

Figure 17:
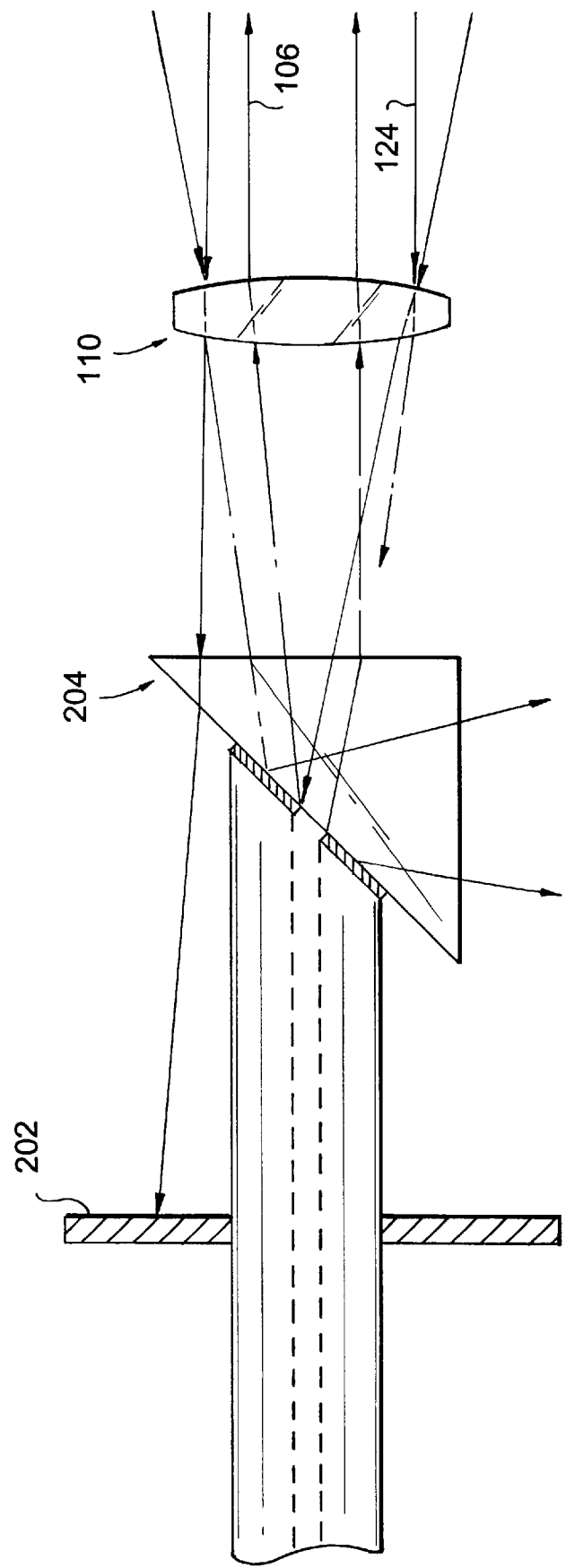
FIG. 17 shows an alternate light sensor that may be used in the transceiver.

Also, with the arrangement shown in FIG. 17, return beam 124 is a very collimated light beam, coming from a very small field of view. Because of this, spurious signals are negligible. Preferably, the 15 GHz modulation is not used here because the large area quadrant sensor 202 does not have sufficient bandwidth. In addition, preferably the sensor 202 is a germanium or gallium arsenide detector, because the more common silicon detectors have low sensitivity at 1.3 μm. When the pointing of laser beam 106 by the tracking system is not perfect in a certain direction, the image in the focal plane of lens 110 is distorted on one side and some light spills over the mirror in the separating prism 204 and hits the quadrant sensor 202. This system, if designed so that some light always spills around the mirror, even when the return beam 124 is centered, can provide the required tracking accuracy.

Figure 18A:
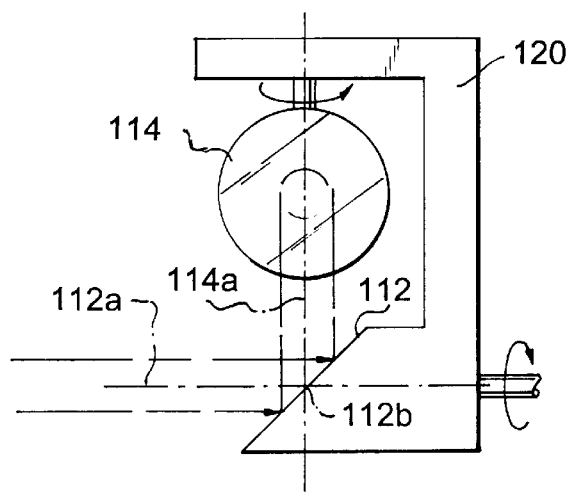
FIGS. 18A and 18B depict a pair of mirrors used in the transceiver and various optical and rotational axes associated with those mirrors.
Figure 18B:
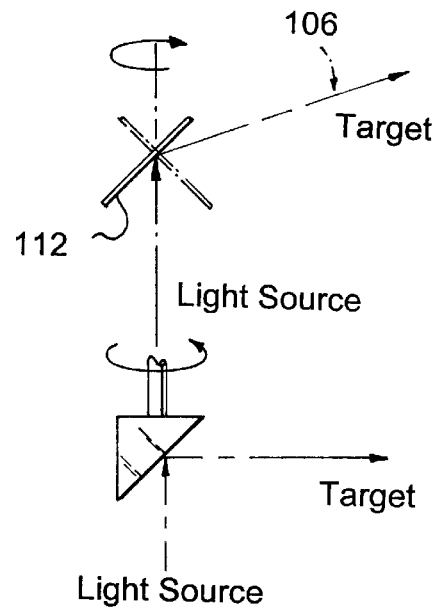

One mechanical arrangement for mounting the mirrors 112 and 114 is shown on FIG. 18A. The mirror 114 rotates with the frame 120 when the mirror 112 is turned. This design may be preferred over a more conventional single mirror mounted on a two axis gimbals for two reasons. First, the coarse tracker system needs to be mounted on an axis that always point toward the beacon from probe 16. For a standard mirror arrangement, the axis of mirror 112 points midway between the laser source and the target, as shown in FIG. 18B. With this 45° design shown in FIG. 18B, mirror 112 will always direct laser beam 106 to the probe. Second, for a very large field of view, and using conventional gimbals, the mirror would need to be very large. In contrast, the arrangement illustrated in FIGS. 18A and 18B works well with small elliptic mirrors.

The main center of rotation 112b of mirror 112 is at the intersection of the two axes of rotation 112a and 114a of mirrors 112 and 114, which preferably meet at the surface of mirror 112. From this main rotation point, the light is transmitted to mirror 114, is reflected 90° by this mirror, and is directed at the retroreflector. The distance measured by the laser range-finder is not the direct distance from the main rotation point 112b to the probe, but instead is the length of this L shaped optical path, including the distance between the two mirrors 112 and 114. The distance between the two mirrors 112 and 114 must be accurately known so the true distance to the probe can be calculated from:

$$d_r^2 = d_m^2 + 2l^2 - 2l d_m$$

where:

$d_r$: true distance to the probe, $d_m$: measured distance to the probe, and l: distance between the two mirrors.

Small errors in the fabrication and alignment of the laser through the transceiver will cause errors, referred to as run-out errors, in the measured distance between the transceiver and probe 16. These errors make a measurement taken in one direction longer or shorter by a few μm then when taken in another direction. Because of the preferred very high accuracy of the machine 10, very low tolerances are preferred in the fabrication and alignment of the various parts of the tracking system. Various types of errors are discussed below.

Error in the 45° Angle of Mirror 112

Figure 19A:
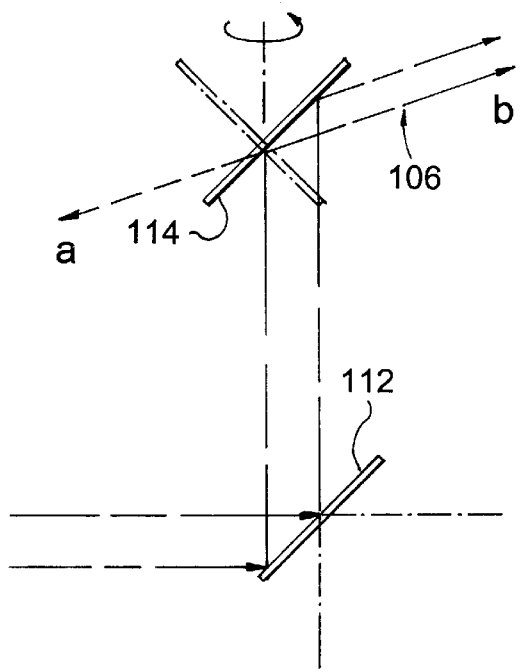
FIGS. 19A–19G schematically show the pair of mirrors used in the transceiver, and illustrate the consequences of various errors in the position or alignment of those mirrors.

Referring to FIG. 19A the effect of an error on the angle of mirror 112 is to move the light beam 106 off the axis of rotation of mirror 114 and also to change the angle at which this beam exits the tracking unit. As will be apparent, all parallel rays entering the tracking unit measure the same distance (the collimated beam measures one distance). With the parallel ray that is on the axis of rotation of mirror 114 (path a and b), then as mirror 114 rotates on its axis, this beam describes a tilted circle. This is acceptable as the tracking system will make small corrections to point in the correct direction. However, under these circumstances, the angle of the L shaped optical path will vary from >90° to <90° and the sum of the squares formula used to find the distance between the transceiver and the probe will not yield the correct result. If the angle of that L-shaped optical path is θ, then the correct formula to use is:

$$d_r^2 = (d_m - l)^2 + l^2 - 2(d_m - l)l \cos \theta$$

For an angle close to 90°, the error introduced is worst when the distance between the transceiver and the probe is relatively small. Using a minimum range of 1 meter, l=3 cm and a maximum allowable error of +/−2 μm, then the angle of mirror 114 must be 45+/−0.002° (35 μrad max. error).

Figure 19B:
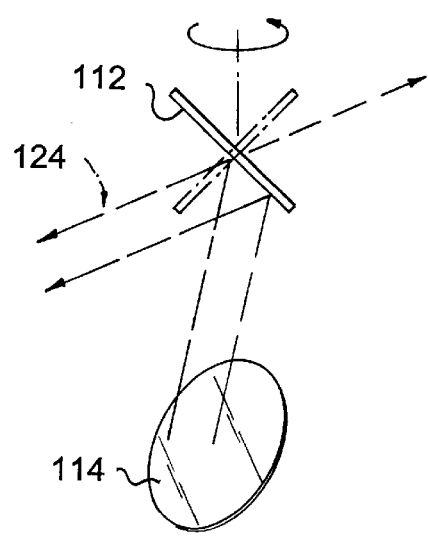

Preferably, the reflection plane of mirror 112 is parallel to the axis of rotation of mirror 114. FIG. 19B is a view in the direction of the laser beam entering the tracker mechanism. Choosing a ray that hits the axis of rotation of mirror 114, we see that the effect of any error in the orientation of the plane of mirror 114 is similar to what was described and calculated above. The required accuracy thus is +/−0.004°. This required accuracy is twice the required accuracy for the angle of mirror 112 because an error in that angle changes the angle of the L shaped optical path by twice the angle of the error. However, there is a one-to-one relationship between an error in the angle of the reflection plane of mirror 114, and the resulting change in the length of the L-shaped optical path—that is, an error of a given angle in the angle of the reflection plane of mirror 114, changes the length of the L-shaped optical path by that given angle.

Error in the 45° of mirror 114

Figure 19C:
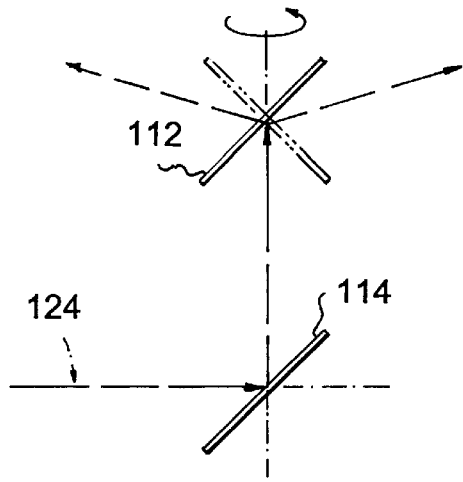

If mirror 114 is not set at 45° from its axis of rotation, the angle of the L shaped optical path will not be 90°, as illustrated in FIG. 19C. Using the same calculation as above, the required precision in this angle is the same; i.e. +/−0.002°.

The same formula can be used to determine the accuracy to which l must be determined. Again, the effect of any error in l is worst when the distance between the transceiver and the probe is relatively small. Using a range of 1 meter, l=3 cm and a maximum allowable error of +/−2 μm, l must be known to +/−60 μm, an easy task.

Error in the Orthogonality of the two Axes of Rotation

Figure 19D:
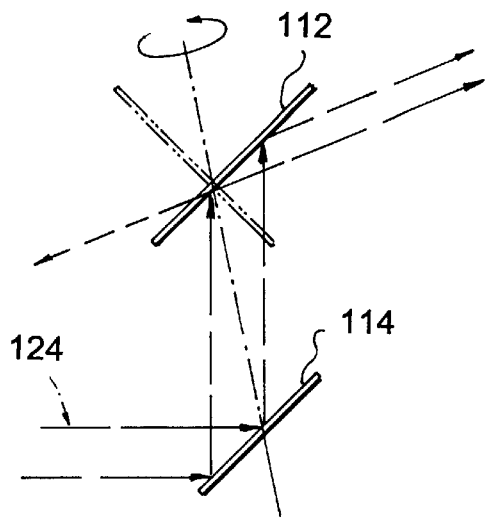

From FIG. 19D, choosing a ray that hits mirror 114 on its axis of rotation (path a), we see that this error produces a similar effect as having an error in the angle of mirror 112. Hence, the accuracy needed is the same, +/−0.004°. Again, there is a one to one relationship between any error in the angle between the two axes of rotation and the resulting error in the angle of the L-shaped optical path, and a given error in the former angle does not produce twice that given error in the latter angle.

Error in the Intersection of the two Axis of Rotation

Figure 19E:
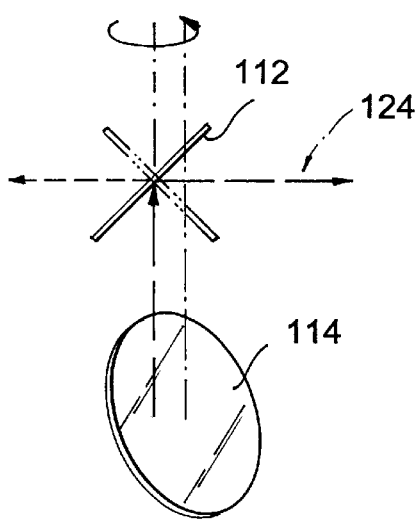

FIG. 19E is a view in the directions of the incoming laser beam. This error is seen to be equivalent to a displacement of the incoming beam. Both do not produce any error in the distance measurement and can have very relaxed specification. The only limit on the size of this error is that the beam 124 must not fall off the mirrors 112 and 114 as the beam goes through the tracking unit.

Error in the Axial Position of Mirror 114

Figure 19F:
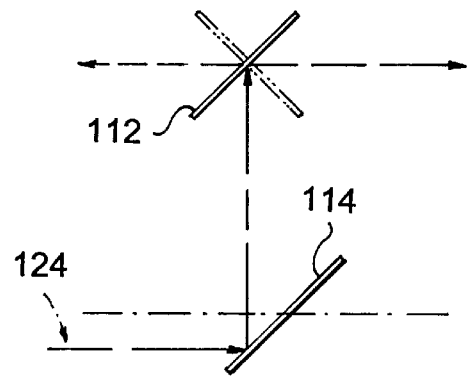

With reference to FIG. 19F, and again choosing the ray that hits mirror 114 on its axis of rotation, it is seen that any error in this parameter does not affect the distance measurement.

Error in the Alignment of the Laser along the First Axis of Rotation

Figure 19G:
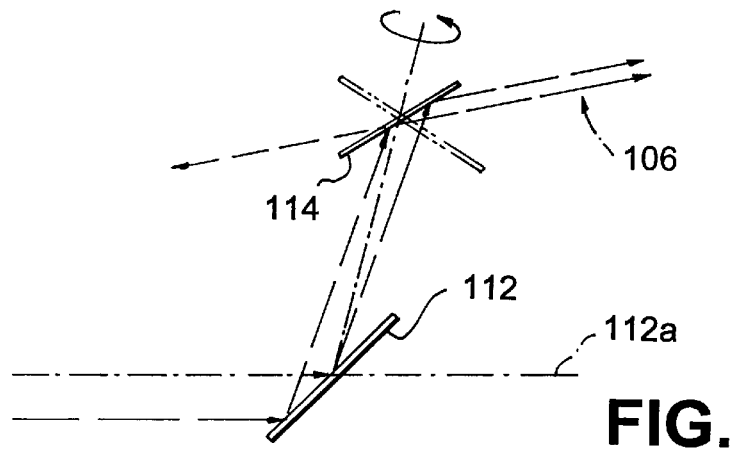

From FIG. 19G, it is apparent that the effect of any error in the alignment of the laser along the axis of rotation of mirror 112 is similar to an angular error on mirror 112 and the required accuracy is thus +/−0.004°. This is twice the required accuracy of the angle of mirror 112, because an error in the angle of mirror 112 changes the angle of the L shaped optical path by twice the error, while there is a one-to-one relationship between any error in the alignment of the laser beam and the axis of rotation of mirror 112, and the resulting change in the angles of the L-shaped optical path.

The above-discussed errors are, to the first order, l sin (θ$_{error}$). Thus, preferably l is as short as possible. A sine plate may be used to set the desired 45° angles of mirrors 112 and 114. In one embodiment that has been actually reduced to practice, the mirrors used did not have parallel face, and these mirrors were positioned using side references. Alternately, the mirrors may be mounted with a front face reference or have very parallel faces. With the former arrangement, the mirrors may be positioned by, first, using a temporary front reference jig and then gluing the mirrors onto permanent mounts. The glue is used to absorb, or adjust for, any difference between the angle of the back side of the mirror and the angle of the mount while keeping the front face of the mirror at the precise 45° of the jig. The plane of reflection of mirror 112 may then be set by using a dial gauge to check that the plane of the mirror has the desired relationship with a precisely machined rotating frame 120.

The laser beam 106 is set parallel to the axis of rotation of mirror 112 by putting a temporary mirror (with parallel faces) on a surface that is precisely machined perpendicular to this axis. An autocollimation is then used to align the beam with this axis of rotation. The power of the laser exiting the separating prism may then be monitored; and a dip in this power occur, when, and thus is a signal when, the laser beam goes exactly back in the optical fiber. This happens only for a good autocollimation. Even with all these precautions, all the angles will not be more precise than about +/−0.01°, giving a distance error of about +/−10 μm. However, all these errors can be calibrated out—that is, compensated for when calibrating the various elements of the tracking system.

Figure 20:
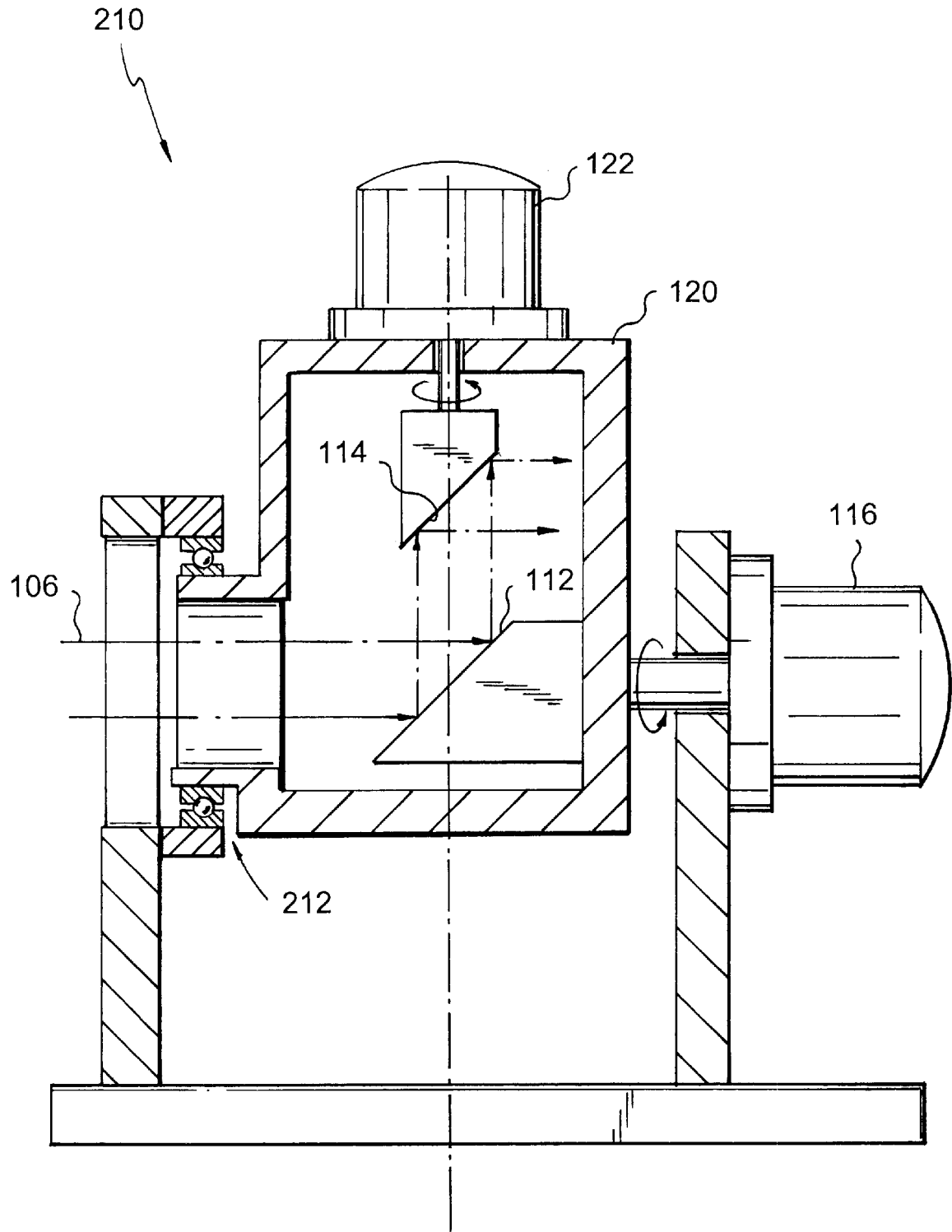
FIG. 20 shows a first tracker unit that may be used in the transceiver of FIG. 6.

FIG. 20 shows a first tracking unit 210 that was actually reduced to practice. This unit 210 relies on the quality of the axes of rotation of the motors 116 and 122 for good operation. The bearing 212 on the axis of motor 116 was carefully preloaded. The reproducibility of the rotation of the motor axes was measured using a capacitance meter and found to be better than 2 μm for radial and axial play of the two axes of rotation after the motors 116, and 122 attained thermal equilibrium. While the motor was warming up, the axis of the motor moved by up to 15 μm. The axial movement of mirror 114 was also measured while turning motor 116 which causes variable gravitational load. No deterioration was observed. If the rotation is reproducible, any error, also referred to as run-out errors, due to misalignment of the motor axis can be calibrated out.

This calibration can be done by putting the retroreflectors 24 and 26 at many accurately known positions all around the tracking unit to be calibrated, and then measuring the distance between probe 20 and the tracking unit under test. The x,y,z position of the averaged main center of rotation of the tracking unit is found from all the distance measurements simultaneously. Because of the run-out, there is no single, well determined, fixed main center of rotation of the tracking unit but an average value can be found. The distance from this average, or virtual, center of rotation to each of the test points is calculated and compared to the measured value. A map of the distance error versus the rotational angle of both motors 116 and 122 is then determined. This map is then installed permanently in the tracker electronics.

The desired calibration may also be done by mounting the tracking unit on a very high accuracy calibrated gimbals with no run out, and measuring the distance from the tracking unit to a fixed retroreflector while tumbling the tracking unit at various angles. The tracking unit will change the direction at which it directs, or points, laser beam 106 in order to keep that laser beam directed at the fixed retroreflector. The distance between the exact center of rotation of the calibration gimbals and the average center of rotation of the tracking unit under test is first determined by fitting all the distance measurements to a small sphere. The radius of this sphere is the rotation offset. The error map is then calculated by comparing each individual measured distance to the calculated one, taking into account the angle of the calibration gimbals and the rotation offset.

Preferably, motors 116 and 122 are stepper motors because of their ease of control and good static stiffness. The slow speed at which the human operator can move the probe 16 means that the speed requirement of the tracking units is rather limited. A maximum rotational speed of 90° per second and a servo loop bandwidth of 10 Hz are sufficient for the motors 116 and 122. Due to the large field of view of the tracking sensor and because of the requirement for an absolute distance measurement between the tracking unit and probe 16, optical contact by the tracking unit with the associated retroreflector is allowed to be lost when the probe 16 accelerates or moves very fast. The desired contact is rapidly reestablished when the probe slows down or stops jerky motion.

In order to simplify the design of the servo loop for the stepper motors, the resonant frequencies determined by the static stiffness and the moment of inertia of the motors are preferably much larger than 10 Hz. The requirements for motor 122 are much less as it only drives a light mirror 114. However, motor 116 drives a relatively heavy assembly. For motor 116, a larger motor was chosen that produces a resonant frequency of 26 Hz. D.C. motors, torque motors and galvanometers may also be used in tracking unit 210 but are less preferred because they have little or no static stiffness and therefore need a more complicated fast servo system to achieve good pointing stability.

In unit 210, a microstepper controller with 125 microsteps/step may be used and connected to a 200 steps/turn stepper motor 116. This gives 25,000 microsteps/turn, a resolution of 0.25 mrad. However, some of the microsteps are bigger than others, and the worst case resolution is 0.5 mrad. The accuracy of the stepper motor is limited by error in rotor and stator teeth construction to 3% of a step, about 1 mrad. Because of the closed loop control, only the resolution is important, not the accuracy. However, if the absolute angle of the laser beam 106 is used in some calculations to determine the position of the probe 20, it may be helpful to consider this accuracy limitation.

Also, the heat produced by the stepper motors may affect the repeatability of the measurement because of warm air convection into the path of the laser beam 106. The affect of the motor heat on the laser beam may be reduced or eliminated by reducing the current in the motor when there is no motion of probe 16, thereby reducing the amount of heat generated by the motor. Also, an enclosed air cooling system may be installed to pump the heat away from the optical path Preferably, a resolution of 100 μrad is obtained. To achieve this, an electromagnet actuated fine tuning mirror (not shown) may be used. Two electromagnets tilt the mirror horizontally and vertically by up to 1 mrad. The laser light is bounced on this fine tuning mirror before the laser light entering the tracking unit. The current in the electromagnet may be continuously varied, providing a very high resolution.

Figure 21:
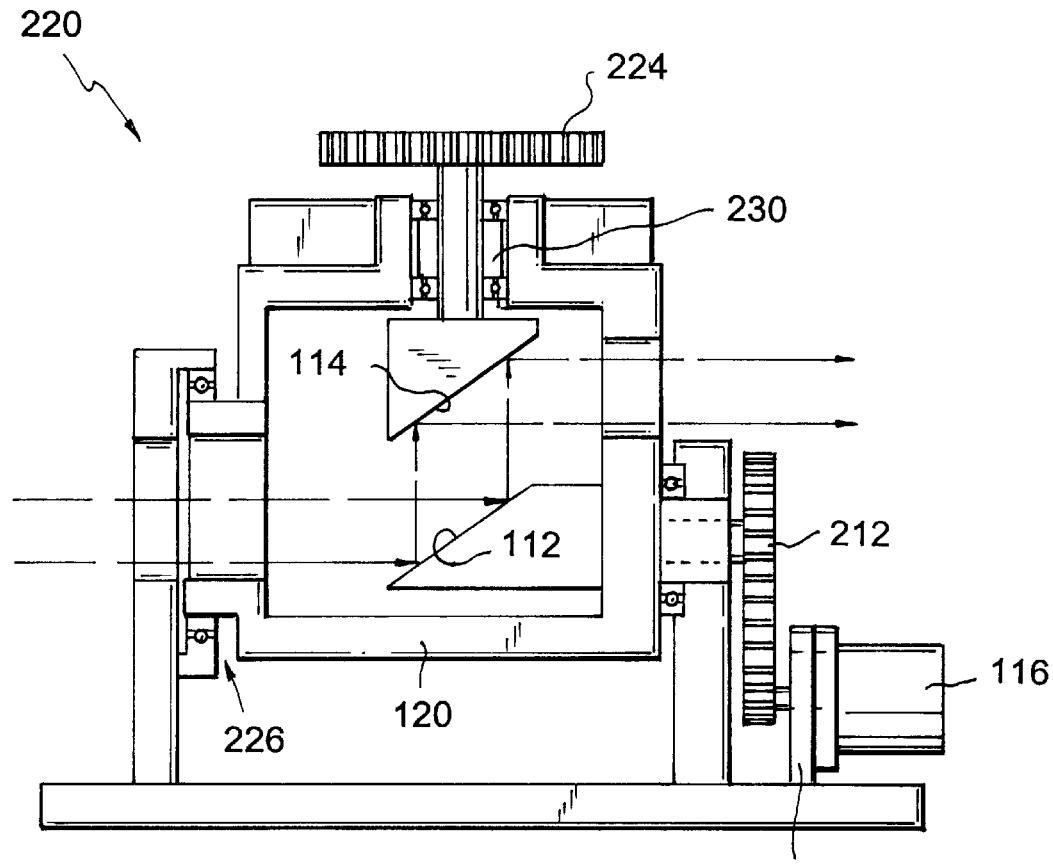
FIGS. 21 and 22 are front and side views, respectively, of a second tracker unit that may be used in the transceiver of FIG. 6.
Figure 22:
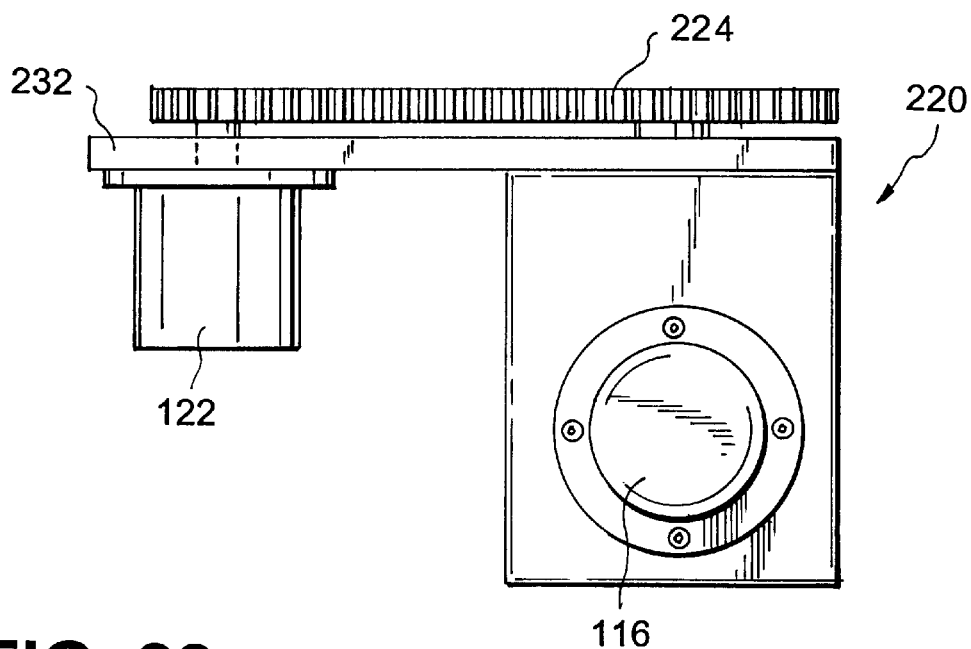

FIGS. 21 and 22 shows a second embodiment of a tracking unit, and generally referenced at 220. In this embodiment, the stepper motors 116 and 120 are geared down by a factor of six using timing belts 222 and 224. In this embodiment, 400 steps/turn motors were selected and the same 125 microsteps/step controller was used. The resolution is increased by a factor of 12 to a worst case of 50 μrad. The static stiffness is also increased by a factor of six, so a small motor can be used for both axes. Good quality, high stiffness timing belts 222 and 224 are used so this stiffness advantage is passed to the rotation axis. However, the accuracy of tracking unit 220 compared to tracking unit 210, is not increased by a factor of 12 because of errors in the spacing of teeth on the stepper motors and belts 222 and 224, and because of eccentricity of the pulleys used to move those timing belts. Even with these errors, though, the accuracy of tracking unit 220 is around 1 mrad.

Also, in this embodiment, the axes of rotation are defined by two high quality preloaded bearings 226 and 230 and are decoupled from the motors 116 and 122, so run out is no longer dependant on the motor axes and can be improved. One of the motors in unit 220 is smaller than the corresponding motor in the tracking unit 210, reducing the heat load generated by motors 116 and 120. The motor 116 and 120 are mounted on a phenolic material 232 with low conductivity and the timing belts 222 and 224 also provide thermal insulation from the motors 116 and 120, which are mounted away from the optical axis. With this thermal design, it may be possible to avoid the use of a cooling system.

Figure 23:
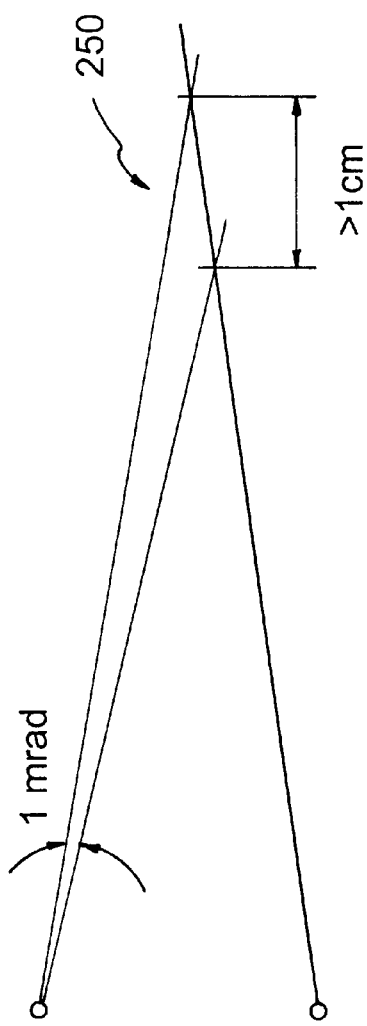
FIG. 23 illustrates the relationship between the degree of uncertainty in an angle, and the resulting amount of uncertainty in a measured distance.

As discussed above, in operation, the transceivers 16 and 18 measure the differences between the phase of the output beam 106 transmitted from the transceiver, and the phase of the reflected beam 124 returned to the transceivers. This phase differences repeats itself whenever the distance between the transceiver and the probe 16 increases or decreases by approximately 1 cm, and thus a single measure of this phase difference may not necessarily find the distance between the transceiver and the probe 20 without ambiguity. Other information may be used to determine this distance without ambiguity. For instance, the angle at which a tracking unit is pointing could be used to determine this distance. However, the absolute accuracy at which this angle is known is only 1 mrad; and at 10 meter, this correspond to a distance of 1 cm. Furthermore, if the angles between the lines-of-sight of the trackers trying to find the position of one of the retroreflector are small, such as shown at 250 in FIG. 23, then the distance along a line-of-sight that corresponds to 1 mrad may be larger than 1 cm. As a result, this approach may not always provide the desired degree of accuracy.

An alternative technique is to use a low frequency signal, such as 15 MHz, to find a rough estimate of the distance between the transceiver and the probe 16. At this frequency, with a phase difference measurement of 0.036° accuracy, the distance between the transceiver and the probe 20 is found to within 1 mm, and this phase difference is repeated only after probe 16 moves ten meters. This later unknown can easily be resolved by the angle of the trackers. The high frequency signal is then used to find the position, within this one mm, to an accuracy of 1 $\mu$m. This technique, however, requires electronic components that have a sufficient bandwidth to go from 15 MHz to 16 GHz.

Figure 24:
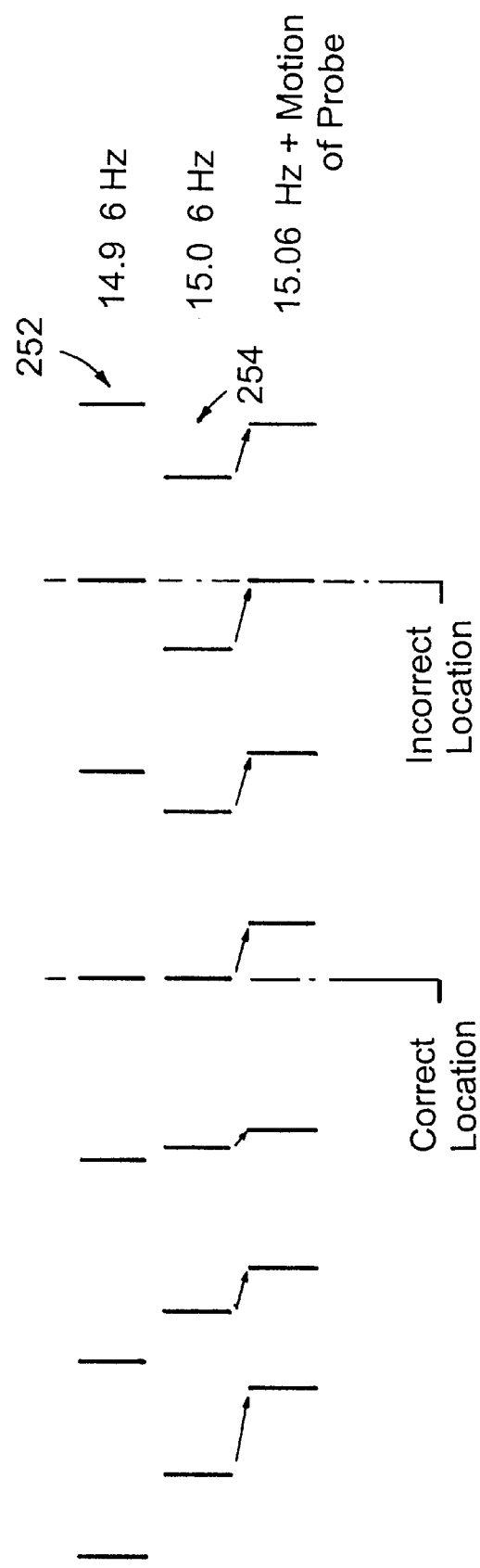
FIG. 24 illustrates how two different frequency signals may be used to identify better a precise location.

Another technique is to use two slightly different high frequency signals, 14.9 and 15 GHz for example. From the first frequency, different possible locations of the probe separated by 9.9 mm can be determined, as depicted at 252 in FIG. 24, and the second signal may be used to identify a set of possible locations of the probe separated by 1 cm, as shown at 254 in FIG. 24. The two frequencies identify the same position once every 150 cm, a distance that can easily be resolved by the angle of the tracker. There is no bandwidth problem with this technique as the frequencies are very close together. Also, both frequencies give a precise position, they can be averaged and give a $\sqrt{2}$ improvement in accuracy.

Figure 25:
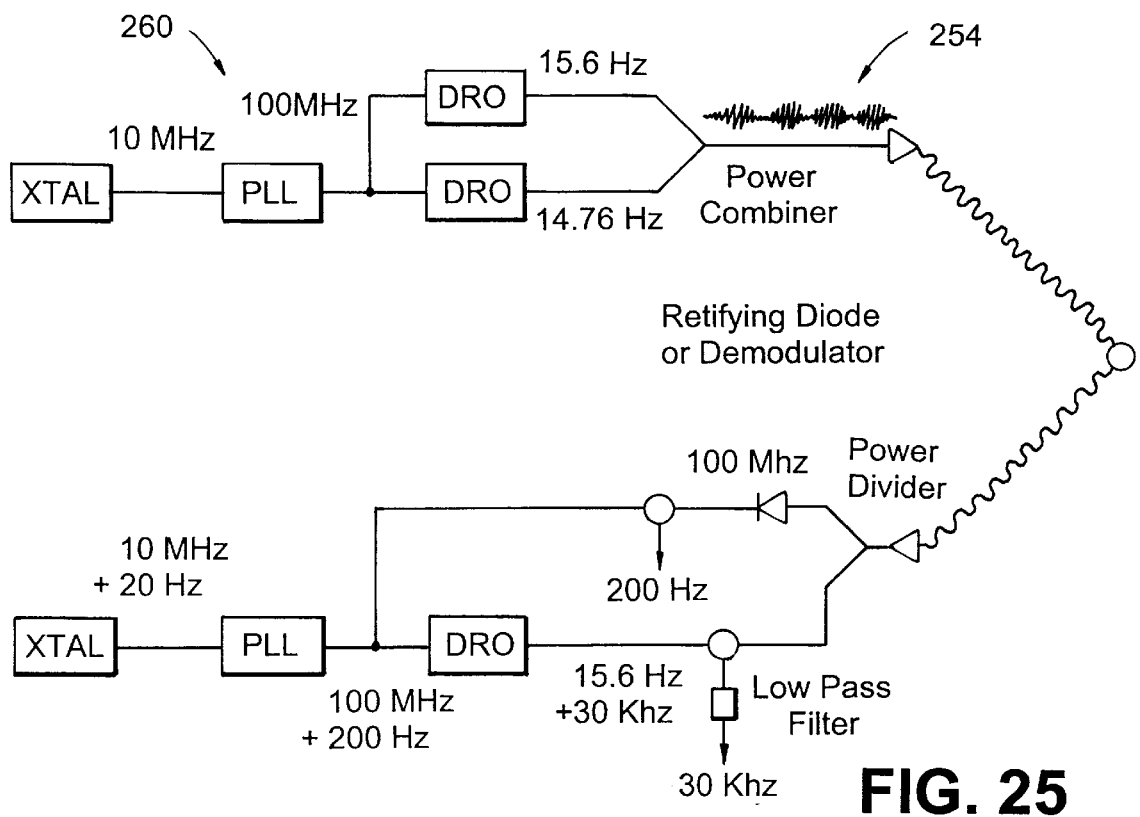
FIG. 25 is a schematic diagram of a system that may be used to generate a particular signal.

If the two close frequencies are sent simultaneously, the signal shown at 254 in FIG. 25 is generated. The beat envelope 254 has a low frequency of 100 MHz and can be used as the coarse measurement frequency using the circuit shown at 260 in FIG. 24. The fine measurement is determined by the usual technique.

Figure 26:
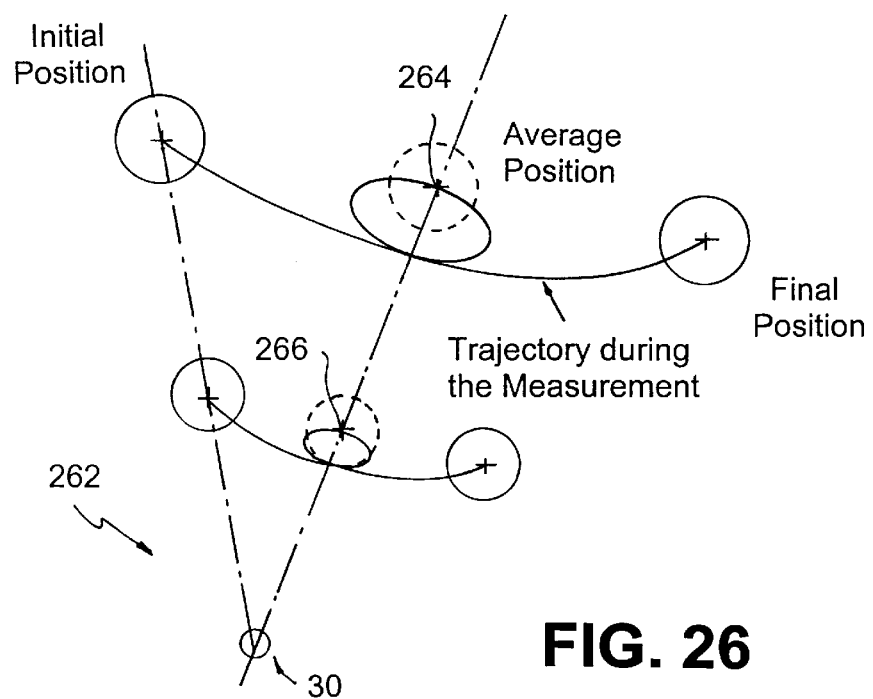
FIG. 26 schematically illustrates various measured positions of the probe of the optical coordinate measuring machine.

With possible motion of the probe of up to 1 mm during the measurement time, it is quite ambitious to expect final accuracy of a few $\mu$m. The position of the tip of the probe is calculated from the measured position of the two retroreflectors. With a fixed tip, solidly planted in a corner, for example as shown at 262 in FIG. 26, an unsteady operator may rotate the probe around the tip during measurement. An average position, referenced at 264 in FIG. 26, over the wobbly trajectory of the upper ball is found. The lower ball follows the exact same trajectory except for a scale factor and the same averaging process takes place. The measurement from all tracker must be taken simultaneously. The two averaged positions 264 and 266 should still point at the same, correct tip position.

If the tip of the probe is on a plane surface, that tip will roll on the surface during measurement and an averaged tip position will be found. However, for a hand held probe on a flat surface, normally only the position in the direction normal to the plane is critical. This coordinate will be measured precisely. In the plane of the surface, an error due to motion of the probe may arise, but this coordinate is often not important. Similarly, when measuring along a linear corner, the probe tip can roll along the line but the two other coordinates are precise. Finally, if the tip is constrained in all directions, the exact position of the probe tip is found.

The tracking systems described above have been discussed in the context of an optical coordinate measuring machine. It should be noted that tracking systems embodying the present invention may be used in other applications. Also, tracking systems embodying the present invention may be used to track moving or stationary articles. For example, an article may be an omni-directional retroreflector and may consist of one or two spheres depending on application.

While it is apparent that the invention herein disclosed is well calculated to fulfill the objects previously stated, it will be appreciated that numerous modification and embodiments may be devised by those skilled in the art, and it is intended that the appended claims cover all such modification and embodiments as fall within the true spirit and scope of the present invention.

We claim:

1. Apparatus for directing a light beam onto a moveable or stationary article, the apparatus comprising:

first and second mirrors for directing a light beam onto a path;

a first motor means connected to the first mirror to move the first mirror;

a second motor means connected to the second mirror to move the second mirror;

a coarse tracking system having a wide field of view: and a fine tracking system having a narrow field of view; and wherein the coarse tracking system senses the article when the article is in the wide field of view, and operates the first and second motors to move the first and second mirrors so that the article becomes located in the narrow field of view; and the fine tracking system senses the article when the article is in the narrow field of view, and operates the first and second motors to move the first and second mirrors to direct the light beam substantially directly onto the article.

2. Apparatus according to claim 1, wherein the coarse tracking means can align the transceiver to within the range 500 mrad.

3. Apparatus according to claim 1, wherein the fine tracking means can align the transceiver to within the range 10 mrad to 1 $\mu$rad.

4. Apparatus according to claim 1, wherein the coarse tracking is accomplished by locating a signal beacon from said article.

5. A means for maintaining the line of-sight between an article and a transceiver, wherein the article sends out a beacon; said beacon can be seen by the transceiver; the transceiver orients itself, using a coarse tracking apparatus that senses the article when the article is in a wide field of view, so that the article becomes located in a narrow field of view; and when the article in the narrow field of view, the transceiver can send out a signal to a retroreflector on the article that will return to the transceiver; this signal falls onto a quad detector and the transceiver then orients itself, using a fine tracking apparatus, to achieve fine alignment between the article and the transceiver.

6. Apparatus for directing a light beam onto a moving article, the apparatus comprising:

first and second mirrors for directing the light beam onto a path;

means movably supporting the first mirror;

means movably supporting the second mirror;

a first motor connected to the first mirror to move the first mirror;

a second motor connected to the second mirror to move the second mirror; and a tracking system connected to the first and second motors to operate the motors to move the mirrors to direct the light beam at the article as the article moves;

wherein the tracking system includes
   i) a coarse tracking means to sense the article when the article is in a wide field of view, and to operate the motors to move the mirrors to locate the article within a narrow field of view, and
   ii) a fine tracking means to sense the article when the article is in the narrow field of view and to operate the motors to move the mirrors to direct the light beam substantially directly onto the article.

7. Apparatus according to claim 6, wherein the article partially reflects the light beam back to the tracking system, and the first and second mirrors direct the reflected beam onto a given path, and wherein the fine tracking means includes:

a lens located on said given path to focus a portion of the reflected beam to a focal point on a focal plane;

a light detector located at said focal plane; and means to operate the first and second motors to move the first and second mirrors to move said focal point to a predetermined area on the light detector.

8. Apparatus according to claim 7, wherein ambient light is incident on the light detector, and the fine tracking system further includes means to reduce the intensity of the ambient light on the light detector.

9. Apparatus according to claim 8, wherein the means to reduce the intensity of the ambient light on the light detector includes:

a graticule disposed in front of the light detector; and means to move the graticule to partially block ambient light from the light detector.

10. Apparatus according to claim 8, wherein:

the graticule includes
   i) a film disposed on the light detector, the film including a series of opaque lines, and
   ii) means to adhere the film to the light detector; and
the means to move the graticule includes means to vibrate the light detector.

11. Apparatus according to claim 10, wherein the means to vibrate the light detector includes:

a piezo actuator;.

means to vibrate the piezo actuator; and means connecting the piezo actuator to the light detector, wherein vibration of the piezo actuator vibrate the light detector.

12. Apparatus for directing a light beam onto an article, said article generating a beacon, the apparatus comprising:

first and second mirrors for directing the first light beam onto a path;

means movably supporting the first mirror;

means movably supporting the first mirror;

a first motor connected to the first mirror to move the first mirror;

a second motor connected to the second mirror to move the second mirror; and a tracking system connected to the first and second motors to operate the motors to move the mirrors to maintain the first light beam directed at the article as the article moves;

wherein the tracking system includes
   i) first and second light panels connected to the first mirror,
   ii) means for moving the first and second light panels until the intensity of the beacon on the first panel is substantially equal to the intensity of the beacon on the second panel,
   ii) third and fourth light panels connected to the second mirror,
   iv) means for moving the third and fourth light panels until the intensity of the beacon on the third panel is substantially equal to the intensity of the beacon on the fourth panel.

13. Apparatus according to claim 12, wherein ambient light is incident on the first, second, third and fourth panels, and the tracking system further includes means to reduce the intensity of the ambient light on the first, second, third and fourth panels.

* * * * *